(12) United States Patent
Haneda et al.

(10) Patent No.: US 8,786,734 B2
(45) Date of Patent: Jul. 22, 2014

(54) IMAGE PICKUP APPARATUS

(75) Inventors: Kazuhiro Haneda, Hachioji (JP);
Makoto Ikeda, Kunitachi (JP);
Yoshinao Shimada, Hino (JP)

(73) Assignee: Olympus Imaging Corp., Tokyo (JP)

( * ) Notice: Subject to any disclaimer, the term of this patent is extended or adjusted under 35 U.S.C. 154(b) by 93 days.

(21) Appl. No.: 13/551,368

(22) Filed: Jul. 17, 2012

(65) Prior Publication Data
US 2013/0038757 A1    Feb. 14, 2013

(30) Foreign Application Priority Data

Aug. 8, 2011    (JP) .................................. 2011-173141

(51) Int. Cl.
*H04N 5/76*      (2006.01)

(52) U.S. Cl.
USPC .................................................... 348/231.99

(58) Field of Classification Search
USPC ........ 348/231.99, 216.1, 222.1, 230.1, 231.9,
348/234, 264, 302, 317, 332, 333.01, 345,
348/353
See application file for complete search history.

(56) References Cited

U.S. PATENT DOCUMENTS

2001/0010559 A1 *  8/2001  Hirasawa et al. ............. 348/350

FOREIGN PATENT DOCUMENTS

| JP | 2004-289870 | 10/2004 |
| JP | 2010-252118 | 11/2010 |

* cited by examiner

*Primary Examiner* — Aung S Moe
*Assistant Examiner* — Chriss Yoder, III
(74) *Attorney, Agent, or Firm* — John C. Pokotylo; Straub & Pokotylo

(57) ABSTRACT

The invention provides an image pickup apparatus including: an image pickup device including a memory portion for analog storage and a pixel portion; a first read-out control and processing portions that, in a first frame-period, read out a first-image-signal from a first-pixel-region of the pixel portion, and in a second frame-period longer than the first frame-period, read out a second-image-signal from a second-pixel-region of the pixel portion including the first-pixel-region, and store the read-out signals in the memory portion; a second read-out control and processing portions that read out from a memory portion an AF image signal related to the first-image-signal and a display image signal related to the second-image-signal; a focal point detecting portion that carries out contrast focal point detection based on the AF image signal; and an image display portion that displays an image based on the display image signal.

5 Claims, 22 Drawing Sheets

IMAGE PICKUP APPARATUS

This application claims benefit of Japanese Application No. 2011-173141 filed in Japan on Aug. 8, 2011, the contents of which are incorporated by this reference.

BACKGROUND OF THE INVENTION

1. Field of the Invention

The present invention relates to an image pickup apparatus which detects a contrast focal point and displays an image based on image signals received from an image pickup device.

2. Description of the Related Art

In electronic image pickup apparatuses, images outputted from image pickup devices at predetermined frame rates have been often used for live views through EVFs or back liquid crystal display panels, or for picking up video images. In image pickup apparatuses such as recent digital cameras, models which can pick up live view images having about the number of pixels of SVGA and video images having the number of pixels of HD video images have become popular. For example, recording and displaying frame rates are standardized for HD video images, and an image pickup frame rate for an HD image pickup mode is 60 fps, for example.

Also, contrast AF for carrying out focal point detection based on an image outputted from an image pickup device is widely used in electronic image pickup apparatuses because advantageously, an additional focal point detecting device and the like is not needed.

Because the contrast AF searches for a peak position of contrast components (e.g., high frequency components) in image signals while moving a focus position of a lens by a hill-climbing scheme, multiple frames of image signals are needed to achieve focus.

In the contrast AF, although it is necessary to extract reliable contrast components from an image signal, if a subject is under insufficient light, a ratio of noise components to signal components becomes high. Thus, for example, Japanese Patent Application Laid-Open Publication No. 2004-289870 describes a technique for, if a subject is under low light, decreasing a frame rate to obtain an image signal with a smaller number of noises and performing contrast AF or image display.

On the other hand, to increase AF speed, a frame rate of an image obtained for focal point detection may be increased. For example, for CMOS image pickup devices, in order to increase a frame rate of an image, a technique is known which reduces the number of pixels outputted from an image pickup device by pixel thin-out read-out, pixel summation read-out or the like.

An image pickup device incorporating a pixel portion and an analog memory in which an analog image signal read out from the pixel portion is stored has been proposed. For example, there is a technique described in Japanese Patent Application Laid-Open Publication No. 2010-252118.

In contrast, it may also be contemplated that a high-resolution image is outputted from an image pickup device at a high frame rate and then processed by an ASIC or the like. However, if establishment of both contrast AF and pickup of HD video images is attempted, as described above, because an image pickup frame rate of an HD image pickup mode is limited to 60 fps, the AF speed of the contrast AF is also limited. Thus, in order to further establish high-speed contrast AF at the same time, it may also be contemplated that an image pickup frame rate is set to integer multiples of 60 fps, for example, 120 fps to add frames for an image to be stored/displayed.

Also, as a frame rate increases, a charge storage time for an image is shortened. Thus, in addition, it is desirable to be able to improve reliability of contrast AF if a subject is under low light.

SUMMARY OF THE INVENTION

An image pickup apparatus according to an aspect of the present invention includes: an image pickup device including a pixel portion having two-dimensionally arranged pixels and an analog memory in which an image signal read out from the pixel portion is stored; an image signal storage control portion that, in a first frame period, reads out a first image signal from a first pixel region of the pixel portion and stores the first image signal in the analog memory as well as, in a second frame period longer than the first frame period, reads out a second image signal including the first image signal from a second pixel region of the pixel portion including the first pixel region and having a larger number of pixels than the first pixel region and stores the second image signal in the analog memory; an image signal read-out control portion that reads out an image signal for focal point detection based on the first image signal and reads out an image signal for display based on the second image signal from the analogy memory; a focal point detecting portion that carries out contrast focal point detection based on the image signal for focal point detection; and an image display portion that displays an image based on the image signal for display.

The above and other objects, features and advantages of the invention will become more clearly understood from the following description referring to the accompanying drawings.

DETAILED DESCRIPTION OF THE PREFERRED EMBODIMENTS

An embodiment of the present invention will now be described with reference to the drawings as follows.

[First Embodiment]

Figure 1:
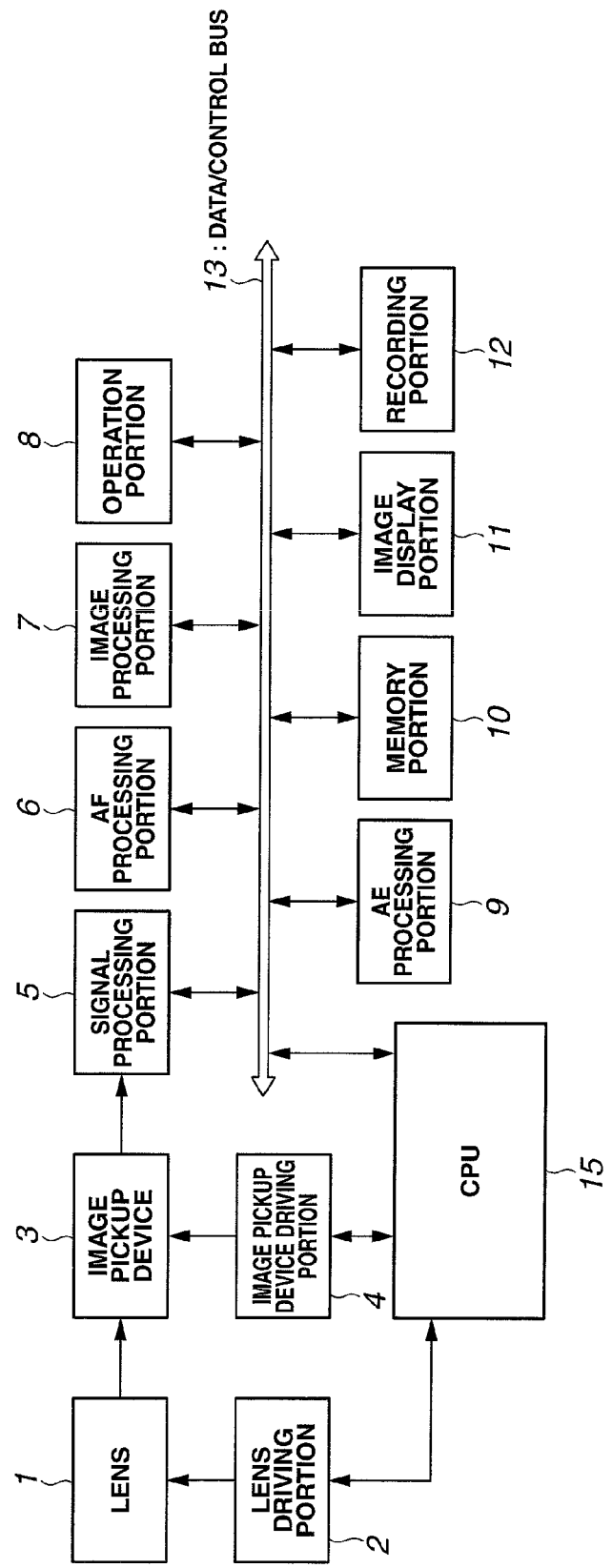
FIG. 1 is a block diagram illustrating a configuration of an image pickup apparatus according to a first embodiment of the present invention.

FIG. 1 through FIG. 27 illustrate a first embodiment of the present invention, and FIG. 1 is a block diagram illustrating a configuration of an image pickup apparatus.

As shown in FIG. 1, the image pickup apparatus includes a lens 1, a lens driving portion 2, an image pickup device 3, an image pickup device driving portion 4, a signal processing portion 5, an AF processing portion 6, an image processing portion 7, an operation portion 8, an AE processing portion 9, a memory portion 10, an image display portion 11, a recording portion 12, a data/control bus 13, and a CPU 15.

Figure 2:
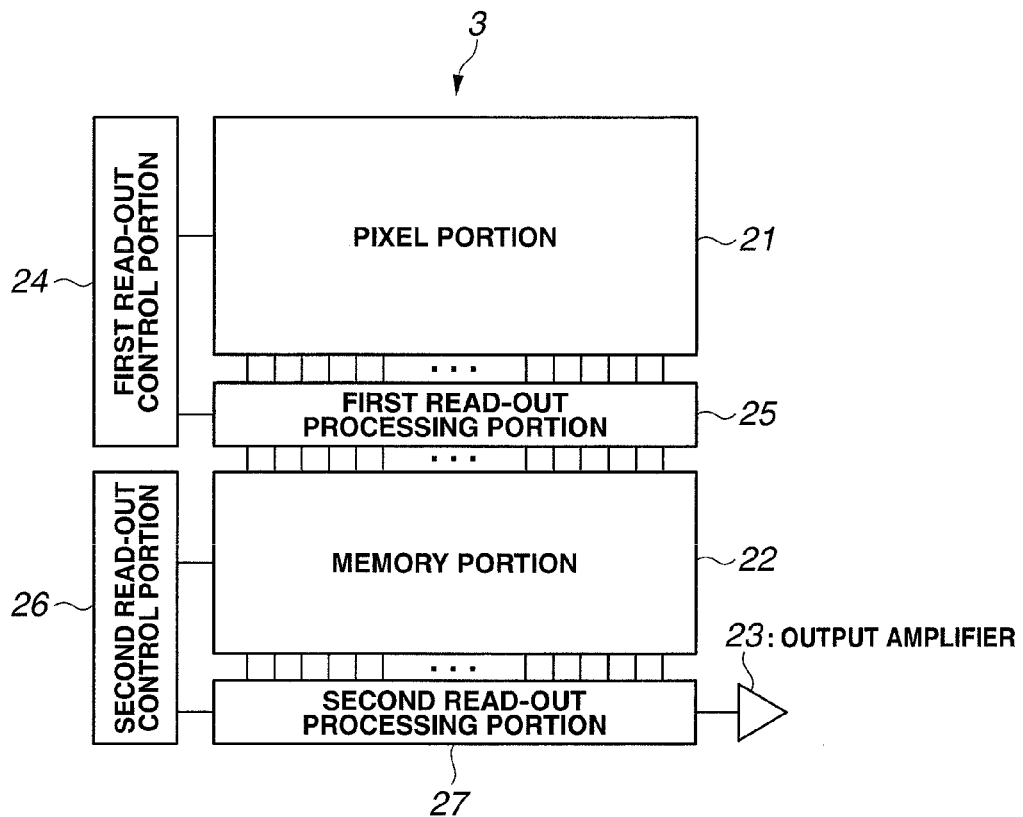
FIG. 2 is a diagram illustrating a configuration of an image pickup device according to the first embodiment.

The lens 1 forms an optical image of a subject in a pixel portion 21 of the image pickup device 3 (see FIG. 2). The lens 1 includes a focus lens for adjusting a focal point position (focal position) to attain focus and a diaphragm for controlling an area of a flux of light passing therethrough. Also, the lens 1 may be a zooming lens that can vary a focal length.

The lens driving portion 2 controls a lens optical condition such as a focus position and a diaphragm (or a focal length if the lens is a power-zoom lens) based on an instruction from the CPU 15 which has received an AF evaluation value from the AF processing portion 6 and a diaphragm value from the AE processing portion 9. That is, the lens driving portion 2 drives a focus lens and the diaphragm to bring an object image formed by the image pickup device 3 into focus with a proper brightness. Also, the lens driving portion 2 outputs lens drive information such as a lens position and a diaphragm drive position to the CPU 15.

The image pickup device 3 outputs the optical image of the subject formed by the lens 1 as an image signal by photoelectric conversion. As described with reference to FIG. 2 later, the image pickup device 3 includes the pixel portion 21 (see FIG. 3) in which pixels 21a performing photoelectrical conversion are two-dimensionally arranged and a memory portion 22 which is an analog memory used to store analog image signals read out from the pixel portion 21.

The image pickup device driving portion 4 generates, in response to an instruction from the CPU 15, a control signal needed for reset/read-out control of the pixel portion 21 and read/write control of the memory portion 22 depending on an image pickup drive mode (e.g., an image pickup drive mode in a still image shooting mode and an image pickup drive mode in an LV (live view) mode) and drives the image pickup device 3. For example, the image pickup device driving portion 4 controls a device shutter of the image pickup device 3 based on an exposure time determined by the AE processing portion 9, under the control of the CPU 15. Then, when the image pickup device driving portion 4 drives the image pickup device 3 in the image pickup drive mode in the still image shooting mode, a still image signal is outputted from the image pickup device 3. Also, when the image pickup device driving portion 4 drives the image pickup device 3 in the image pickup drive mode in the LV mode, an image signal for use in focal point detection and an image signal for use in display are outputted from the image pickup device 3 as described later. Furthermore, the image pickup device driving portion 4 outputs drive information for the image pickup device 3 to the CPU 15.

The signal processing portion 5 performs analog signal processing such as level correction and amplitude adjustment on the image signal outputted from the image pickup device 3, thereafter A/D converting the resulting signal to generate a digital signal.

The AF processing portion 6 is a focal point detecting portion that detects contrast information of a luminance signal and the like based on the image signal for focal point detection outputted from the image pickup device 3 to calculate and output an AF evaluation value to the CPU 15. That is, the image pickup apparatus is configured to enable for focal point detection by contrast AF.

The image processing portion 7 performs various types of image processing on the image signal outputted from the image pickup device 3, including colorization processing such as demosaicing, noise correction processing, color correction processing, image compression processing, and record image format generation processing. The image processing portion 7 generates an image for LV display in an LV image format if the image signal outputted from the image pickup device 3 is an image signal for display. Furthermore, as described later, if an image signal for display is read out as divided signals, the image processing portion 7 combines the divided image signals for display.

The operation portion 8 is used for a variety of operation inputs to the image pickup apparatus. The operation portion 8 includes operation members (e.g., a switch and a touch panel) such as a power switch for turning on/off the image pickup apparatus, a release button for inputting an instruction to shoot a still image or video images, and a mode button for setting a still image shooting mode, a video image shooting mode, LV mode, and the like.

The AE processing portion 9 detects a luminance level based on the image signal for display and the like outputted from the image pickup device 3 and outputs AE control information needed for setting a diaphragm value, an exposure time (namely, a shutter speed, being a charge storage time), sensitivity, and the like.

The memory portion 10 includes volatile memory such as line memory and frame memory needed for the image processing portion 7 and the like to perform image processing and non-volatile memory used to record a control program for the image pickup apparatus, written before factory shipment, a variety of types of data, and the like.

The image display portion 11 includes an EVF (an electronic view finder) and a back liquid crystal display panel, and displays an image. That is, the image display portion 11 displays a picked-up still image as well as displays, as an image for finder, an image for LV generated by the above-described image processing portion 7 based on an image signal for display. Furthermore, the image display portion 11 also displays a variety of types of information and the like related to the image pickup apparatus.

The recording portion 12 is used to save a still image and video images in a recording medium such as a memory card.

The data/control bus 13 is bidirectionally connected to the signal processing portion 5, the AF processing portion 6, the image processing portion 7, the operation portion 8, the AE processing portion 9, the memory portion 10, the image display portion 11, the recording portion 12, and the CPU 15, and is used for transferring a variety of types of data and a control signal therebetween.

The CPU 15 controls the entire image pickup apparatus in response to an operation input from the operation portion 8.

FIG. 2 is a diagram illustrating a configuration of the image pickup device 3. The image pickup device 3 includes the pixel portion 21, the memory portion 22, an output amplifier 23, a first read-out control portion 24, a first read-out processing portion 25, a second read-out control portion 26, and a second read-out processing portion 27.

The pixel portion 21 is composed of the plurality of pixels 21a (see FIG. 3) arranged two-dimensionally (in a matrix: see FIG. 5 and the like) that generate signal charge depending on an exposure amount by photoelectric conversion.

The memory portion 22 is analog memory in which signal charge of the respective pixels 21a arranged in the pixel portion 21 is temporarily accumulated, and is configured, for example, to have the same number of and the same arrangement of memories as the respective pixels 21a arranged in the pixel portion 21. Generally, because image signals for focal point detection and image signals for display have a smaller number of constituting pixels than still image signals, the memory portion 22 may store image signals for focal point detection and image signals for display of multiple frames.

The first read-out control portion 24 is an image signal storage control portion. The first read-out control portion 24 generates control signals for controlling the pixel portion 21 and the first read-out processing portion 25.

The first read-out processing portion 25 is an image signal storage control portion. The first read-out processing portion 25 adds signals read out from the pixel portion 21 for each row and amplifies such signals.

In the LV mode, the first read-out control portion 24 and the first read-out processing portion 25 read out first image signals from a first pixel region (see FIG. 5) of the pixel portion 21 in a first frame period and store the signals in the memory portion 22. Also, the first read-out control portion 24 and the first read-out processing portion 25 read out second image signals including the first image signals from a second pixel region (see FIG. 5) of the pixel portion 21 in a second frame period, being longer than the first frame period, the second pixel region including the first pixel region and having a larger number of pixels than the first pixel region, and store the read-out signals in the memory portion 22.

The second read-out control portion 26 is an image signal read-out control portion. The second read-out control portion 26 generates control signals for controlling the memory portion 22 and the second read-out processing portion 27.

The second read-out processing portion 27 is an image signal read-out control portion. The second read-out processing portion 27 performs noise reduction processing such as CDS (correlated double sampling) on a signal read out from the memory portion 22, as well as addition to the signal in a horizontal direction or a vertical direction, and carries out horizontal read-out.

In the LV mode, the second read-out control portion 26 and the second read-out processing portion 27 read out from the memory portion 22 an image signal for focal point detection based on the first image signal as well as an image signal for display based on the second image signal.

The output amplifier 23 amplifies signals horizontally read out by the second read-out processing portion 27.

Figure 3:
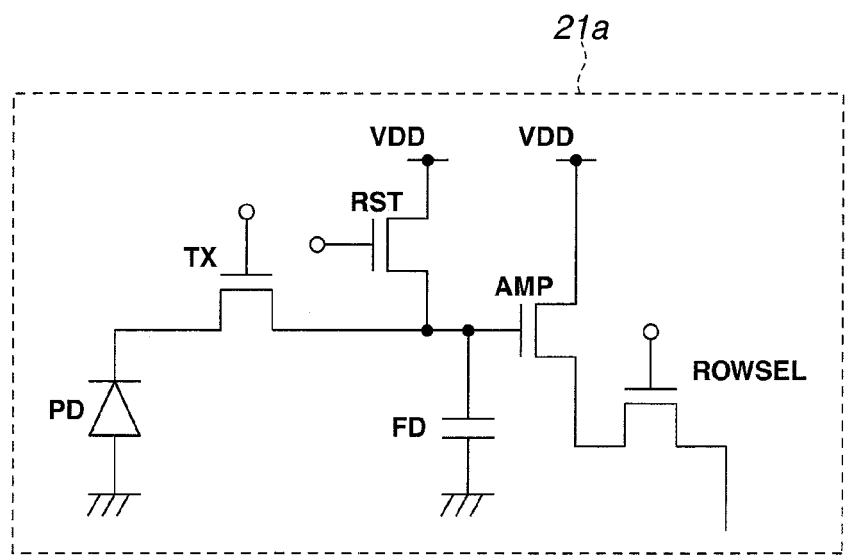
FIG. 3 is a circuit diagram illustrating an example of a configuration of a unit pixel arranged in a pixel portion of the first embodiment.

FIG. 3 is a circuit diagram illustrating an example of a configuration of a unit pixel 21a arranged in the pixel portion 21.

A pixel 21a of the pixel portion 21 includes a PD (photodiode) being a photoelectric conversion portion and an FD (floating diffusion) being a signal storage portion for temporarily holding a signal from the photoelectric conversion portion PD when an electric charge is read out. The photoelectric conversion portion PD generates a signal charge depending on an incident light and holds/accumulates the generated signal charge. Also, the signal storage portion FD is a storage space in which signal charges transferred from the photoelectric conversion portion PD are temporarily held/accumulated. One end of the photoelectric conversion portion PD and one end of the signal storage portion FD are each grounded.

A transferring transistor TX for transferring a signal charge accumulated in a photoelectric conversion portion PD to a signal storage portion FD is serially connected between the other end of the photoelectric conversion portion PD and the other end of the signal storage portion FD. A gate terminal being an input portion of the transferring transistor TX is connected to the first read-out control portion 24 so that a transfer pulse is supplied from the first read-out control portion 24 and thereby the transferring transistor TX is turned on/off.

An AMP is an amplifying transistor that functions as an amplifying portion. The AMP amplifies and outputs a signal that is based on a signal charge accumulated in the signal storage portion FD and is inputted to a gate terminal of the AMP. That is, the amplifying transistor AMP is also connected to a voltage source VDD, so that the AMP with the VDD further constitutes a source-follower amplifier in connection with a current source, not shown.

An RST is an FD reset transistor for resetting input portions of the signal storage portion FD and the amplifying transistor AMP. A gate terminal being an input portion of the FD reset transistor RST is connected to the first read-out control portion 24 so that an FD reset pulse is supplied from the first read-out control portion 24 and thereby the FD reset transistor RST is turned on/off. In such a configuration, the FD reset transistor RST is turned on and the transferring transistor TX is also turned on at the same time, and thereby the signal storage portion FD and the photoelectric conversion portion PD can be simultaneously reset.

A ROWSEL is a row selecting transistor turned on when a signal in the signal storage portion FD is read out through the amplifying transistor AMP. A gate terminal being an input portion of the row selecting transistor ROWSEL is connected to the first read-out control portion 24 so that a row selection pulse is supplied from the first read-out control portion 24 and thereby the row selecting transistor ROWSEL is turned on/off.

According to such a configuration, a signal from the photoelectric conversion portion PD is once accumulated in the signal storage portion FD, then amplified by the amplifying transistor AMP, and outputted to the memory portion 22.

Figure 4:
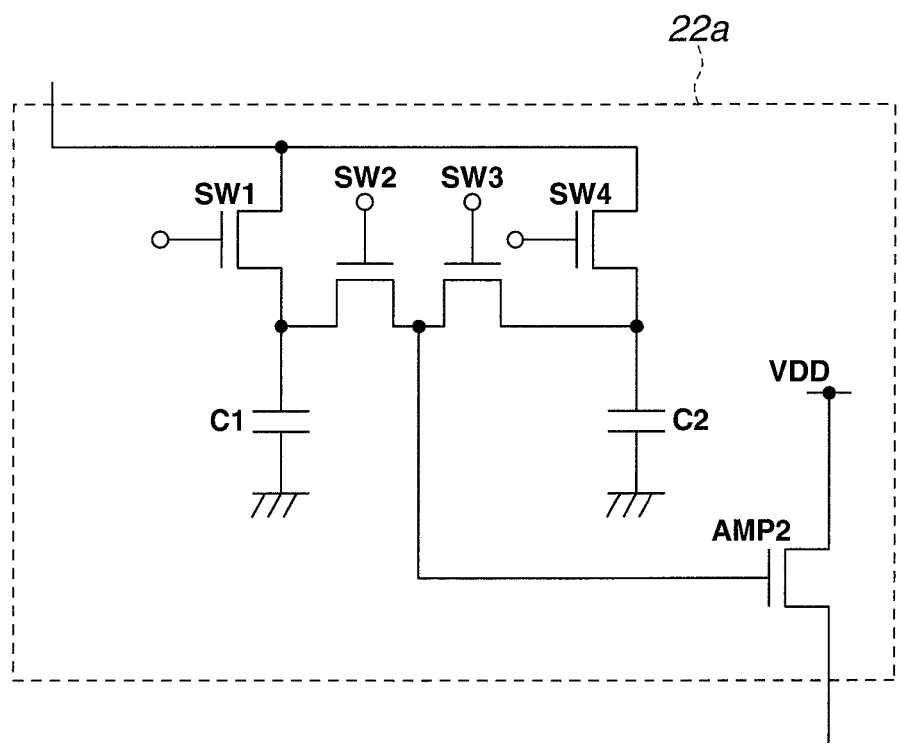
FIG. 4 is a circuit diagram illustrating an example of a configuration of a unit memory arranged in a memory portion of the first embodiment.

FIG. 4 is a circuit diagram illustrating an example of a configuration of a unit memory 22a arranged in the memory portion 22.

The memory portion 22 includes capacitors C1 and C2, switches SW1 to SW4, and an amplifying transistor AMP2.

The capacitors C1 and C2 are storage spaces in which electric charges transferred from the pixel portion 21 are temporarily held/accumulated. One of the capacitors C1 and C2 is used to accumulate reset noises and the other is used to accumulate signal charges. Here, for example, the capacitor C1 is used to accumulate such reset noises and the capacitor C2 is used to accumulate such signal charges.

The switch SW1 is a switch that is on when a reset noise from the pixel portion 21 is transferred to the capacitor C1.

The switch SW4 is a switch that is on when a signal charge from the pixel portion 21 is transferred to the capacitor C2.

The switch SW2 is a switch that is on when a reset noise accumulated in the capacitor C1 is read out.

The switch SW3 is a switch that is on when a signal charge accumulated in the capacitor C2 is read out.

An amplifying transistor AMP2 functions as an amplifying portion similarly to the above-described amplifying transistor AMP in the pixels 21a. The AMP2 amplifies and outputs a signal that is based on a reset noise accumulated in the capacitor C1 and is inputted to a gate terminal of the AMP2 or a signal based on a signal charge accumulated in the capacitor C2. Thus, the amplifying transistor AMP2 also constitutes a source-follower amplifier in connection with a voltage source VDD and a current source.

In this manner, the memory portion 22 is configured as memory which allows non-destructive read-out.

Figure 5:
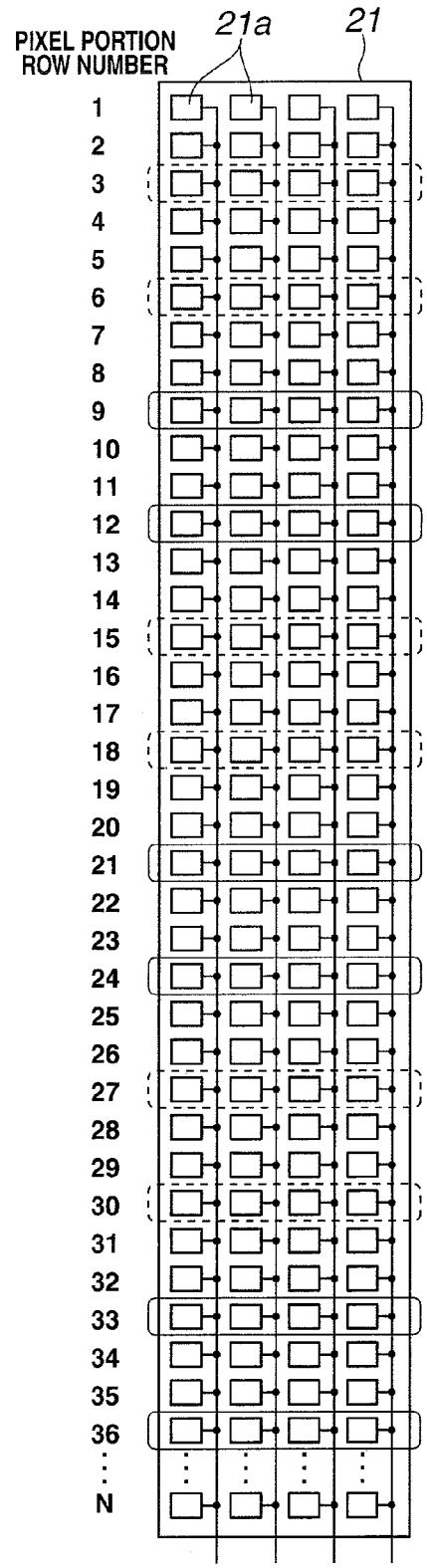
FIG. 5 is a diagram illustrating an example of a first pixel region and a second pixel region in the pixel portion of the first embodiment.

FIG. 5 is a diagram illustrating an example of the first pixel region and the second pixel region in the pixel portion 21. Note that row numbers (line numbers) of the pixels 21a arranged in the pixel portion 21 are shown in FIG. 5 for reference. In FIG. 5, a common N-row configuration is shown, but in regards to columns, a four-column configuration is shown for simplicity. However, it goes without saying that an actual image pickup device is generally composed with more columns.

In FIG. 5, the pixels 21a surrounded by dotted lines are used as the first pixel region as well as used as the second pixel region. Also, the pixels 21a surrounded by solid lines are used as the second pixel region but not used as the first pixel region. Furthermore, the pixels 21a that are not surrounded by the solid lines or the dotted lines are used as neither the first pixel region nor the second pixel region.

The first pixel region is a pixel region from which a first image signal for generating an image signal for focal point detection is read out.

Also, the second pixel region is a pixel region from which a second image signal for generating an image signal for display is read out.

In the example shown in FIG. 5, 3i lines (i is an integer being 1 or more) are the second pixel region, and (3+12j) lines and (6+12j) lines (j is an integer being 0 or more) are the first pixel region.

Figure 6:
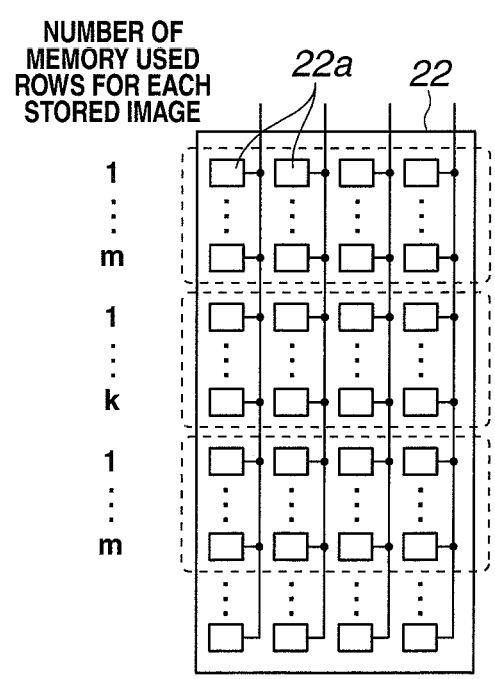
FIG. 6 is a diagram illustrating how image signals are accumulated in the memory portion in image pickup control 1 of the first embodiment.

FIG. 6 is a diagram illustrating how image signals are accumulated in the memory portion 22 in image pickup control 1.

As described later with reference to FIG. 10 and the like, the image pickup control 1 is an image pickup control mode in which read-out of a first image signal from the first pixel region and read-out of a second image signal from the second pixel region are alternately carried out.

For example, first, a first image signal (e.g., corresponding to F1 in FIG. 10 described later) is read out from the first pixel region and stored in the memory portion 22. It is here assumed that the number of total lines in the first pixel region is m. In the case where the first pixel region as shown in FIG. 5 is adopted, if N is a large number, m is approximately equal to N/6.

Then, second image signals including first image signals are read out from the second pixel region including the first pixel region and stored in the memory portion 22. It is here assumed that the number of total lines in the second pixel region is k (k>m). In the case where the second pixel region as shown in FIG. 5 is adopted, if N is a large number, k is approximately equal to N/3.

Subsequently, read-out from the first pixel region and read-out from the second pixel region are alternately and repeatedly carried out in this way.

In the case where the number of unit memories 22a arranged in the memory portion 22 is equal to the number of unit pixels 21a arranged in the pixel portion 21, if the first pixel region and the second pixel region as shown in FIG. 5 are adopted, substantially first image signals for two frames and second image signals for two frames can be stored in the memory portion 22. Then, if a maximum storage capacity of the memory portion 22 is reached, oldest data is overwritten with latest data. Thereby, data for latest multiple frames is stored in the memory portion 22.

Figure 7:
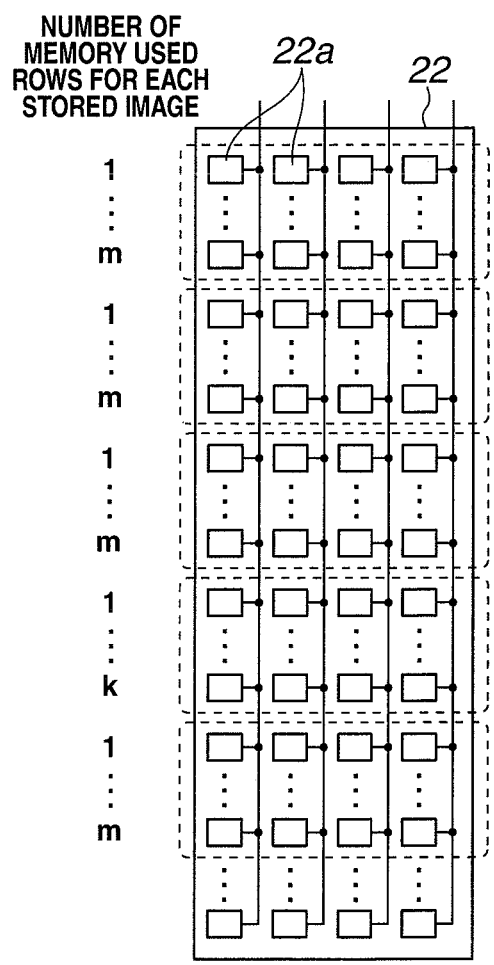
FIG. 7 is a diagram illustrating how image signals are accumulated in the memory portion in image pickup control 2 of the first embodiment.

FIG. 7 is a diagram illustrating how image signals are accumulated in the memory portion 22 in image pickup control 2.

As described later with reference to FIG. 11 and the like, the image pickup control 2 is an image pickup control mode in which three read-outs of a first image signal from the first pixel region and one read-out of a second image signal from the second pixel region are repeatedly performed. As described later, the above-mentioned image pickup control 1 is an image pickup control mode applied if a subject is under normal light, but in contrast, the image pickup control 2 is an image pickup control mode applied if a subject is under low light. Thus, in the image pickup control 1, the second frame period for reading out a second image signal is twice as long as the first frame period for reading out a first image signal, but in the image pickup control 2, a second frame period is four-fold.

In this case, three frames of first image signals each composed of m lines are stored, and then one frame of a second image signal composed of k lines is stored. Also after that, such storing is repeated, and as a result, latest multiple frames of image signals are stored in the memory portion 22. In the case where the number of unit memories 22a arranged in the memory portion 22 is equal to the number of unit pixels 21a arranged in the pixel portion 21, if the first pixel region and the second pixel region as shown in FIG. 5 are adopted, in the image pickup control 2, substantially four frames of first image signals and one frame of second image signal can be stored in the memory portion 22.

Figure 8:
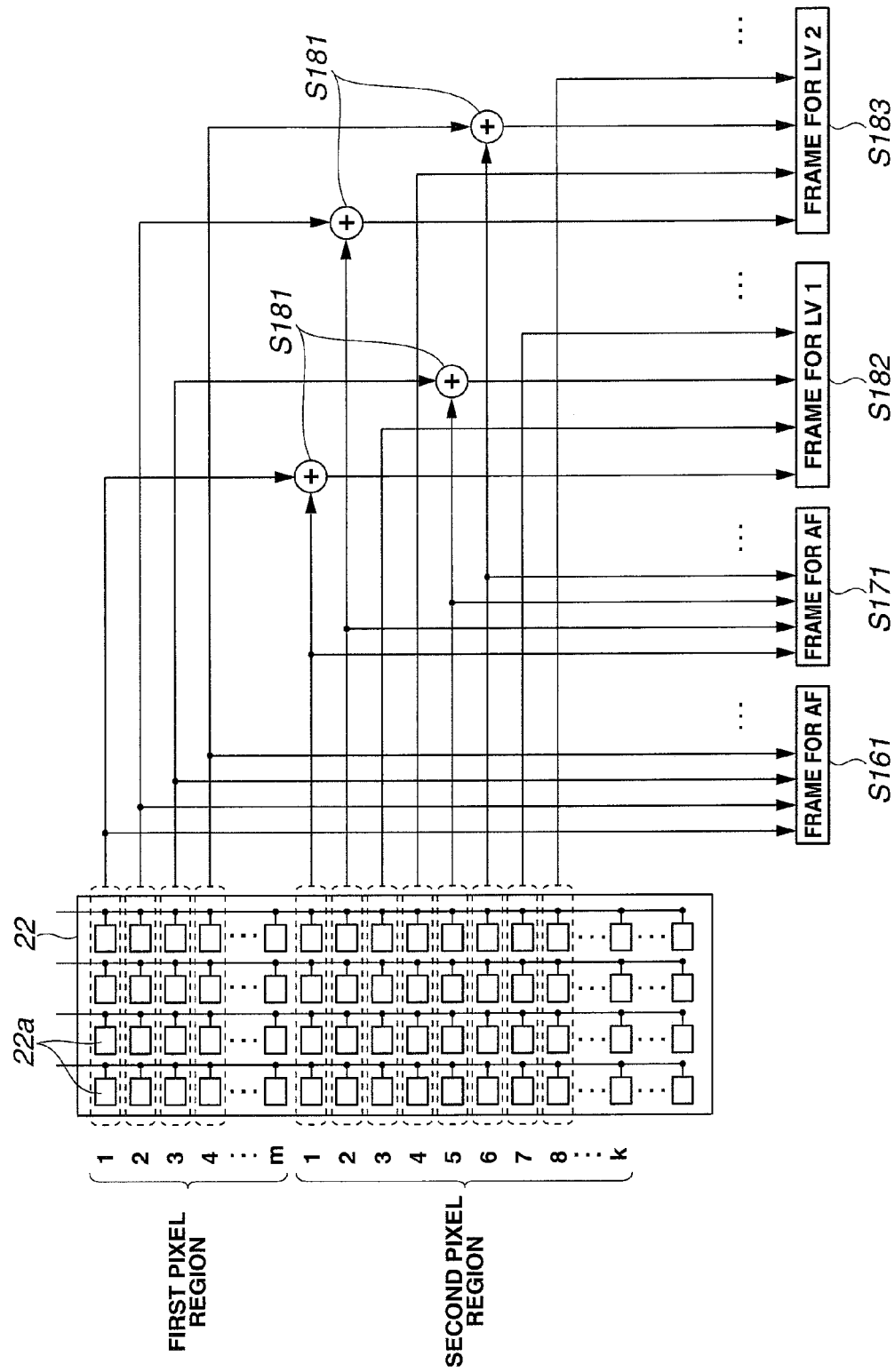
FIG. 8 is a diagram illustrating how image signals are read out from the memory portion in the image pickup control 1 of the first embodiment.

FIG. 8 is a diagram illustrating how image signals are read out from the memory portion 22 in the image pickup control 1. It should be noted that in FIG. 8 and FIG. 9 to FIG. 11 described later, step numbers corresponding to those in flow charts described later are also described.

In the image pickup control 1, if read-out of a first image signal from the first pixel region and read-out of a second image signal from the second pixel region are performed alternately and repeatedly, an average charge storage time for the first pixel region is, for example, half of a charge storage time for the second pixel region. Thus, if second image signals read out from the second pixel region are directly used as image signals for display, a signal level of pixels corresponding to the first pixel region is low. Thus, a first image signal and a second image signal are added for each corresponding pixel position, and thereby image signals for display having same charge storage time for all the pixels are generated.

The above-mentioned pixel addition may be carried out by the image processing portion 7 or the like outside the image pickup device 3, but in order to enable more high-speed processing with low power consumption and low clock by reducing the number of pixels read out from the image pickup device 3, the pixel addition is performed by the second read-out processing portion 27 in the image pickup device 3 based on control by the second read-out control portion 26 in the image pickup device 3.

First, a first image signal in a certain frame directly becomes an image signal for focal point detection and is used for a frame for AF. A first image signal included in a second image signal obtained in a next frame becomes an image signal for focal point detection and used for a next frame for AF.

Further, an image signal for display is divided and read out by an image signal read-out control portion into a plurality of time periods between read-out time periods of frames for AF. In the example shown in FIG. 8, image signals for display are divided and read out into a frame for LV 1 and a frame for LV 2. More specifically, in the case of a second image signal composed of k lines, for example, odd-numbered lines are read out for the frame for LV 1 and even-numbered lines are read out for the frame for LV 2. Then, a first image signal in a second image signal is added for each pixel position to which a first image signal, in a next previous frame, corresponds, and thereby an image signal for display is generated.

Figure 9:
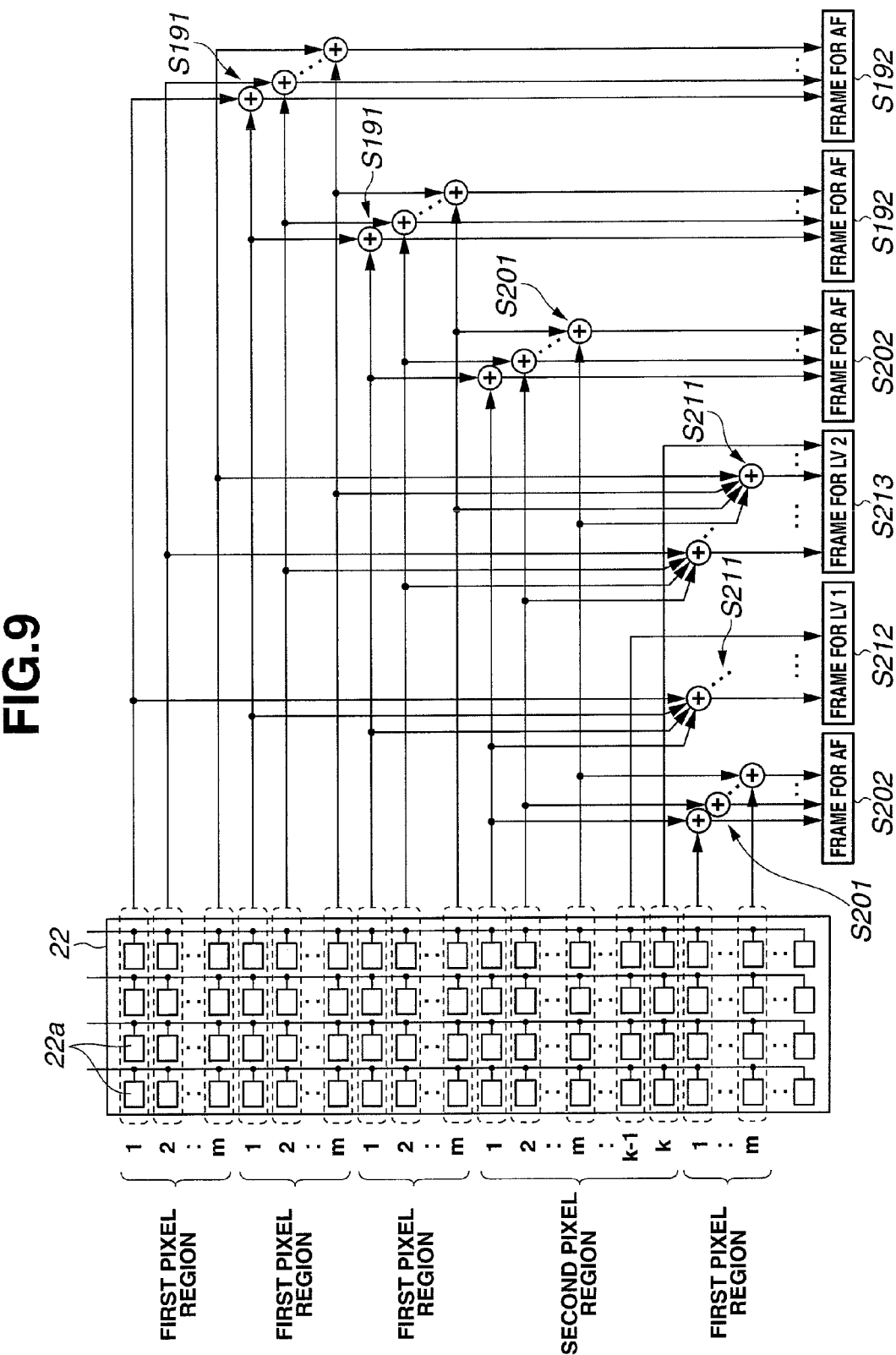
FIG. 9 is a diagram illustrating how image signals are read out from the memory portion in the image pickup control 2 of the first embodiment.

FIG. 9 is a diagram illustrating how image signals are read out from the memory portion 22 in the image pickup control 2.

In the image pickup control 2, an average charge storage time of first image signals read out from the first pixel region in the first frame period is, for example, ¼ of a charge storage time of a second image signal read out from the second pixel region in the second frame period. Thus, a second image signal and three consecutive first image signals next previous to the second image signal are added for each corresponding pixel position, and thereby image signals for display having same charge storage time for all the pixels are generated.

Furthermore, in the image pickup control 2, two consecutive first image signals (first image signals read out from the first pixel region or first image signals included in the second image signals read out from the second pixel region) are added to generate an image signal for focal point detection. It is because if a subject is under low light, the accuracy of focal point detection may be reduced since a signal level of first image signals read out in the first frame period is low and an S/N ratio is reduced. Thus, it is contemplated to improve the accuracy of focal point detection by increasing the signal level.

The pixel addition of two first image signals is performed by the second read-out processing portion 27 in the image pickup device 3 based on the control by the second read-out control portion 26 in the image pickup device 3 in the same manner as described above.

Similarly to the image pickup control 1, an image signal for display is divided and read out into a plurality of time periods between read-out time periods in the frame for AF. At this time, as to first image signals in a second image signal, as described above, next previous three consecutive frames of first image signals are added to generate an image signal for display.

Figure 10:
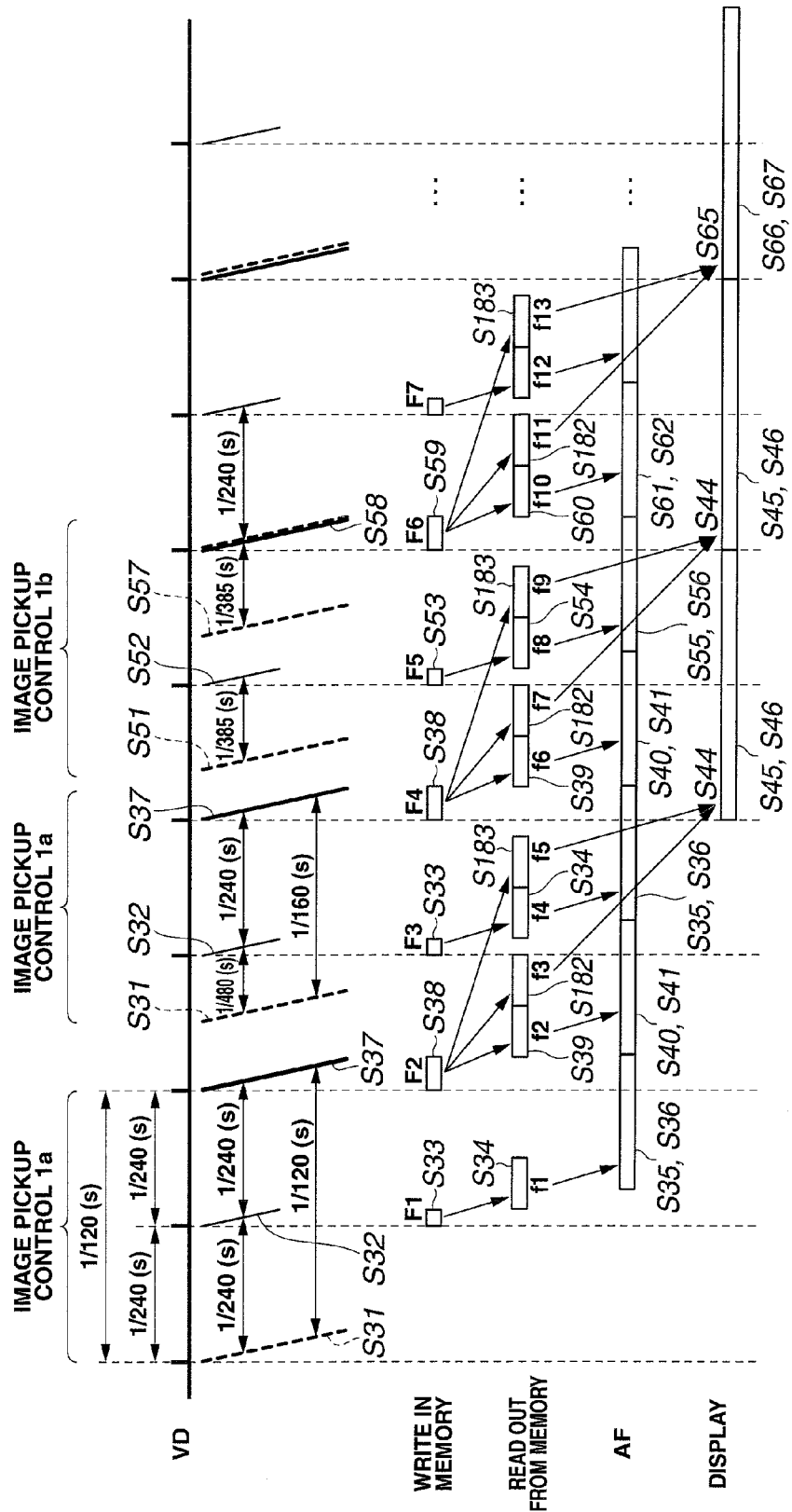
FIG. 10 is a timing chart showing an example of processing of the image pickup control 1 according to the first embodiment.
Figure 11:
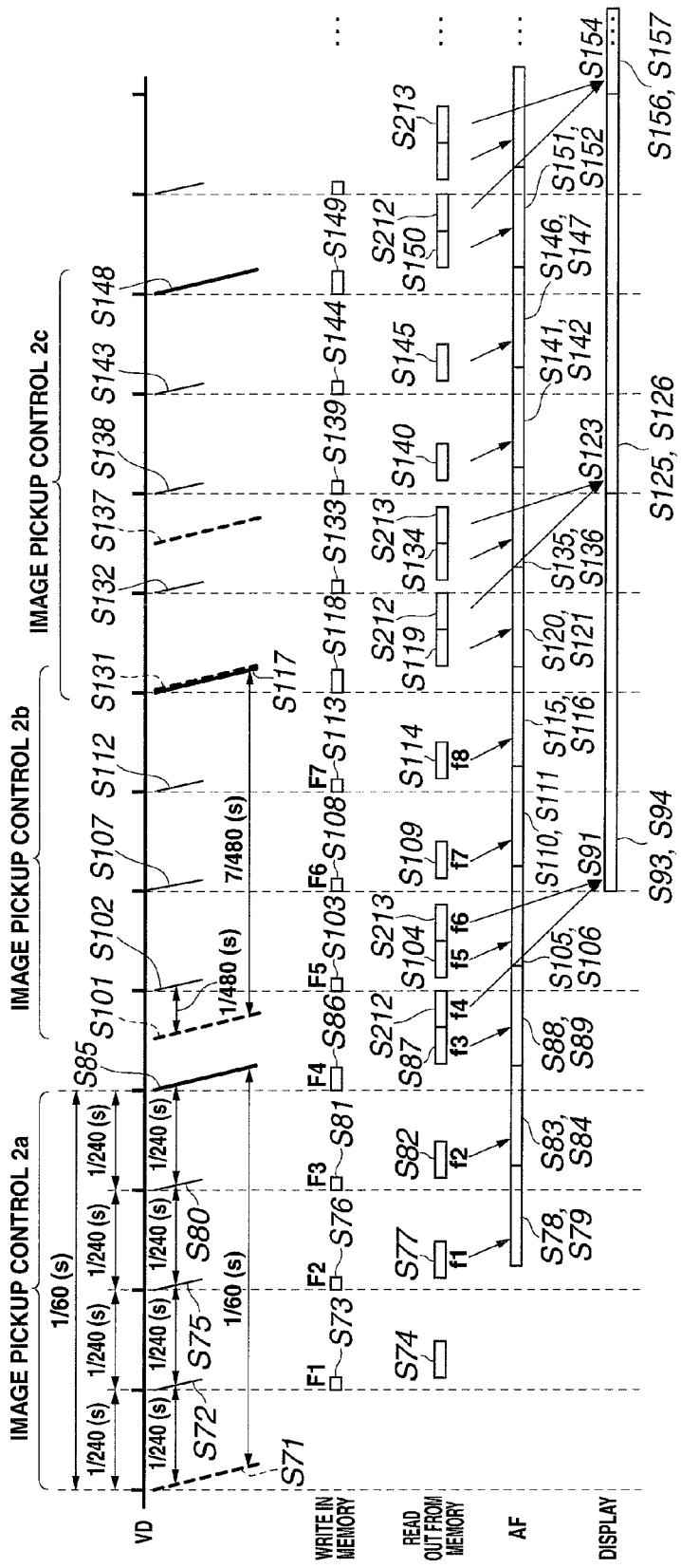
FIG. 11 is a timing chart showing an example of processing of the image pickup control 2 according to the first embodiment.
Figure 12:
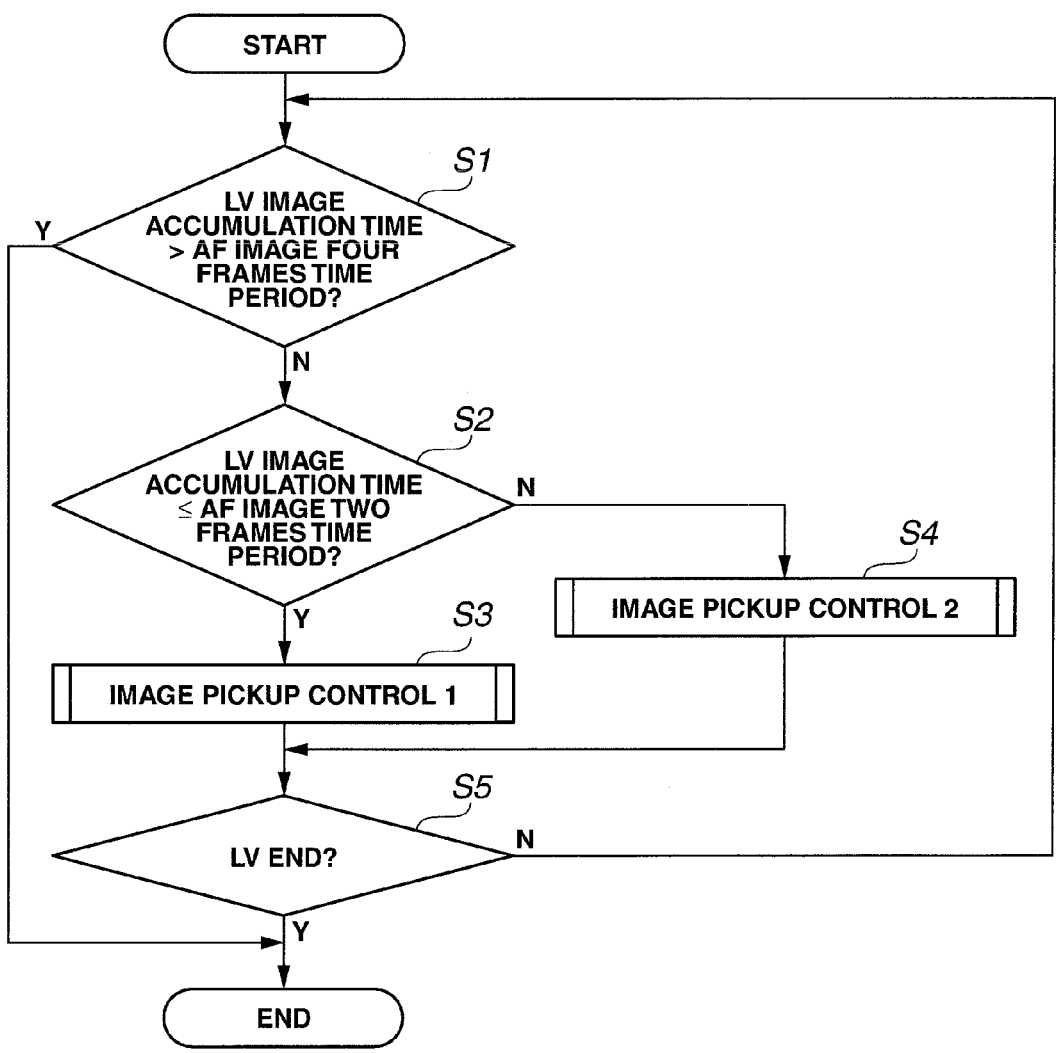
FIG. 12 is a flow chart showing a process to display an LV in the image pickup apparatus according to the first embodiment.

FIG. 10 is a timing chart showing an example of processing in the image pickup control 1, FIG. 11 is a timing chart showing an example of processing in the image pickup control 2, and FIG. 12 is a flow chart showing a process to display an LV in the image pickup apparatus. The flow charts shown in FIG. 12 and FIG. 13 to FIG. 27 described later will be described with appropriate reference to FIG. 10 and FIG. 11.

In the example shown in FIG. 10, a first frame period in which a first image signal is read out from the first pixel region of the pixel portion 21 is $1/240$ second, and a second frame period is $1/120$ second in which second image signals including first image signals are read out from the second pixel region of the pixel portion 21, including the first pixel region and having a larger number of pixels than the first pixel region.

Also, in the example shown in FIG. 11, a first frame period in which a first image signal is read out from the first pixel region of the pixel portion 21 is $1/240$ second, and a second frame period in which a second image signal is read out from the second pixel region is $1/60$ second.

These examples are not restrictive, and image pickup control may be performed so that a second frame period is longer than a first frame period. Of course, the time periods indicated by numbers in FIG. 10 and FIG. 11 are only a typical example, and the shown time periods are not restrictive.

Once the LV mode is set, the processing shown in FIG. 12 is started. First, it is determined whether or not an accumulation time of an LV image (an accumulation time of a second image signal) is larger than four frames of time periods (first frame period) for picking up an AF image (a first image signal) (step S1).

If it is determined that the accumulation time of the LV image is equal to or smaller than the four frames of the AF image pickup time periods, then further, it is determined whether or not the accumulation time of the LV image is equal to or smaller than two frames of the AF image pickup time periods (step S2).

If it is determined that the accumulation time of the LV image is equal to or smaller than the two frames of the AF image pickup time periods, the image pickup control 1 is performed (step S3). If it is determined that the accumulation time of the LV image is larger than the two frames of the AF image pickup time periods, the image pickup control 2 is performed (step S4).

If the image pickup control 1 in step S3 or the image pickup control 2 in step S4 is completed, it is determined whether or not to terminate the LV (step S5). If the LV is not terminated, the processing returns to the step S1 and the above-mentioned processing is repeated.

Also, if it is determined that the LV is terminated in step S5 or if it is determined that the accumulation time of the LV image is larger than the four frames of the AF image pickup time periods in step S1, then the processing is ended.

In the LV mode of the present embodiment, the image pickup control 1 or the image pickup control 2 is performed depending on light under which a subject is, but it is not convenient that LV display is forcibly terminated if an accumulation time of an LV image is larger than four frames of AF image pickup time periods. Thus, if it is determined that an accumulation time of an LV image is larger than four frames of AF image pickup time periods and the processing is ended, the accumulation time of the LV image may be reset to be equal to or smaller than the four frames of AF image pickup time periods and thereafter the processing of the LV mode may be automatically executed again. Alternatively, before the execution of the LV mode, an accumulation time of an LV image may be set in advance so that the accumulation time does not exceed four frames of AF image pickup time periods.

Figure 13:
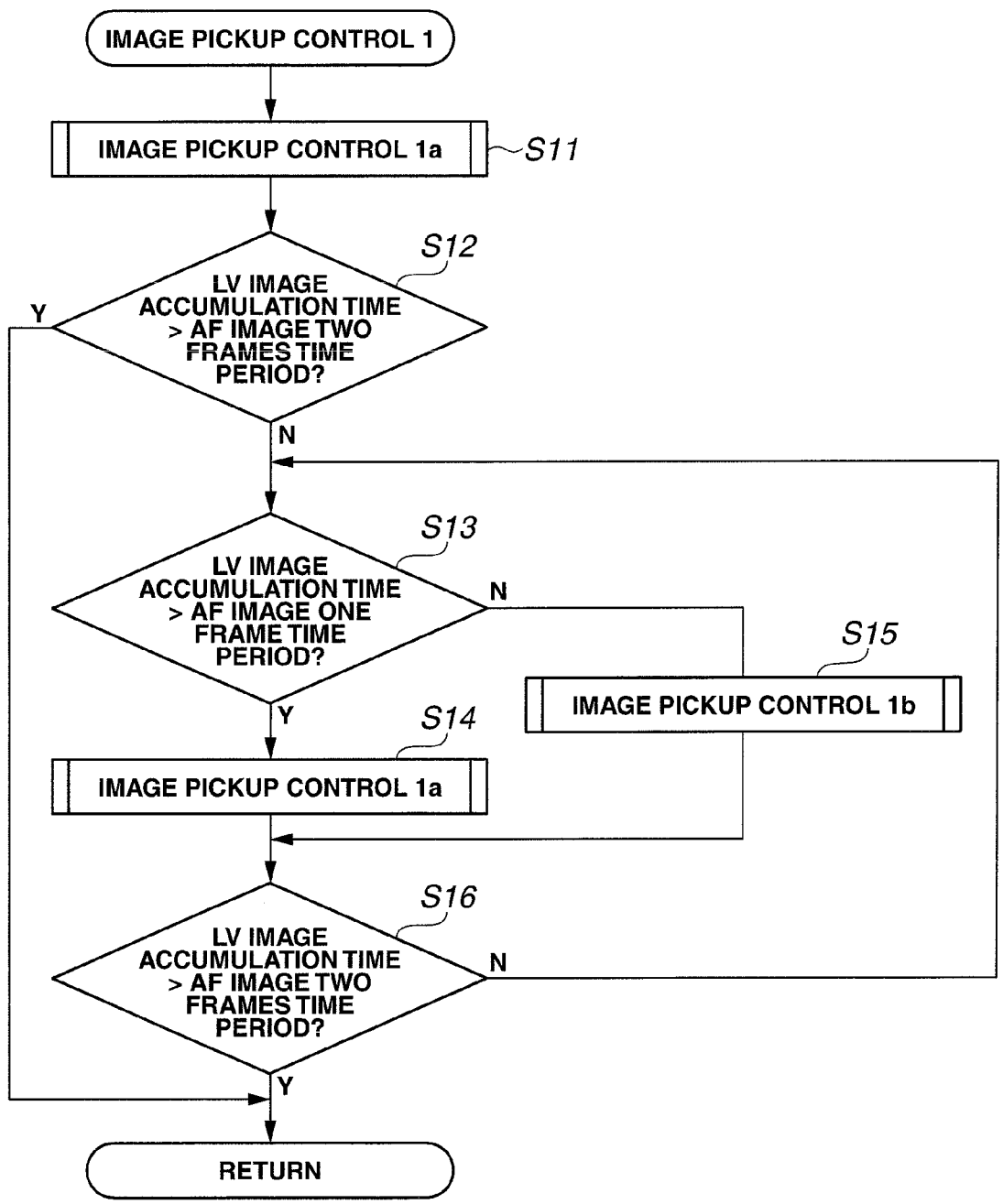
FIG. 13 is a flow chart showing the processing of the image pickup control 1 according to the first embodiment.

FIG. 13 is a flow chart showing the processing in the image pickup control 1.

If the processing starts, first, image pickup control 1*a* (see FIG. 15) described later is performed (step S11).

Then, it is determined whether or not the accumulation time of the LV image is larger than two frames of AF image pickup time periods (step S12). The determination in the above step S2 shows that the accumulation time of the LV image has been equal to or smaller than the two frames of AF image pickup time periods before the execution of step S11, but the purpose of the processing is to determine whether the accumulation time has been larger than the two frames of AF image pickup time periods after the execution of step S11.

If it is determined that the accumulation time of the LV image is equal to or smaller than the two frames of AF image pickup time periods, then further, it is determined whether or not the accumulation time of the LV image is larger than one frame of AF image pickup time period (step S13).

Then, if it is determined that the accumulation time of the LV image is larger than the one frame of AF image pickup time period, the image pickup control 1*a* is performed (step S14), and if it is determined that the accumulation time is equal to or smaller than the one frame of AF image pickup time period, image pickup control 1*b* (see FIG. 16) is performed (step S15).

Then, once the processing in step S14 or step S15 is terminated, it is determined again whether or not the accumulation time of the LV image is larger than the two frames of AF image pickup time periods (step S16).

If it is determined that the accumulation time is equal to or smaller than the two frames of AF image pickup time periods, the processing returns to step S13 and the processing as mentioned above is executed.

Also, in this step S16 or the above-mentioned step S12, if it is determined that the accumulation time is larger than the two frames of AF image pickup time periods, the processing returns from this processing to the processing shown in FIG. 12.

Figure 14:
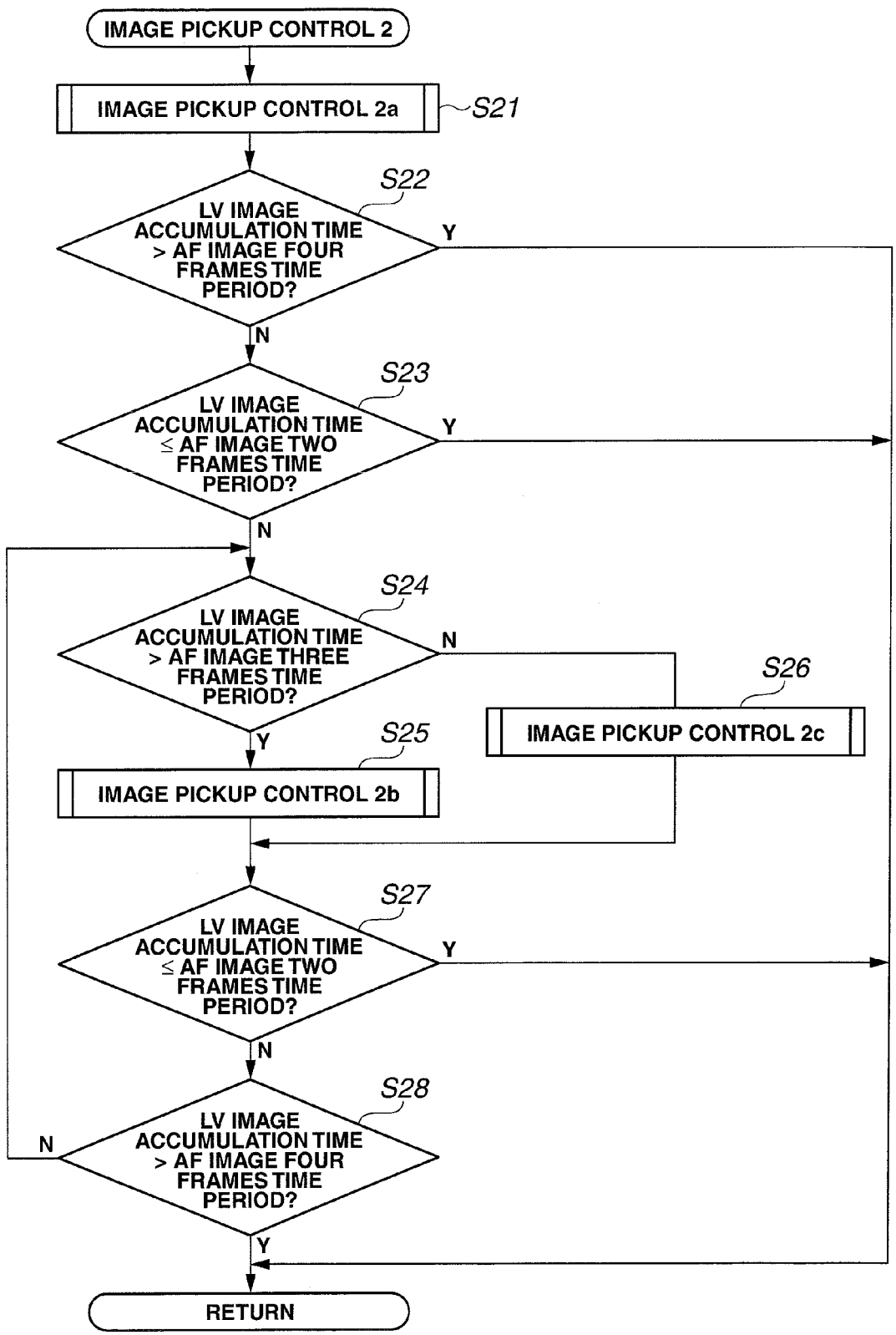
FIG. 14 is a flow chart showing the processing of the image pickup control 2 according to the first embodiment.

FIG. 14 is a flow chart showing the processing of the image pickup control 2.

If the processing starts, first, image pickup control 2*a* (see FIG. 17) described later is performed (step S21).

Then, it is determined whether or not the accumulation time of the LV image is larger than four frames of AF image pickup time periods (step S22). If it is determined that the accumulation time is equal to or smaller than the four frames of AF image pickup time periods, then further, it is determined whether or not the accumulation time of the LV image is equal to or smaller than the two frames of AF image pickup time periods (step S23). The determination in the above step S1 and step S2 shows that the accumulation time of the LV image has been larger than the two frames of AF image pickup time periods and equal to or smaller than the four frames before the execution of step S21, but this condition may not be satisfied after the execution of step S21. For this reason, the determination is performed.

In step S23, if it is determined that the accumulation time is larger than the two frames of AF image pickup time periods, then further, it is determined whether or not the accumulation time of the LV image is larger than three frames of AF image pickup time periods (step S24).

Then, if it is determined that the accumulation time is larger than the three frames of AF image pickup time periods, image pickup control 2*b* (see FIG. 18) is performed (step S25). If it is determined that the accumulation time is equal to or smaller than the three frames of AF image pickup time periods, image pickup control 2*c* (see FIG. 19) is performed (step S26).

Then, once the processing in step S25 or step S26 is terminated, it is determined again whether or not the accumulation time of LV image is equal to or smaller than the two frames of AF image pickup time periods (step S27).

If it is determined that the accumulation time is larger than the two frames of AF image pickup time periods, then further, it is determined whether or not the accumulation time of the LV image is larger than the four frames of AF image pickup time periods (step S28).

If it is determined that the accumulation time is equal to or smaller than the four frames of AF image pickup time periods, the processing returns to step S24 and the processing as mentioned above is executed.

If it is determined in step S22 or step S28 that the accumulation time is larger than the four frames of AF image pickup time periods, or it is determined in step S23 or step S27 that the accumulation time is equal to or smaller than the two frames of AF image pickup time periods, then the processing returns from this processing to the processing shown in FIG. 12.

Figure 15:
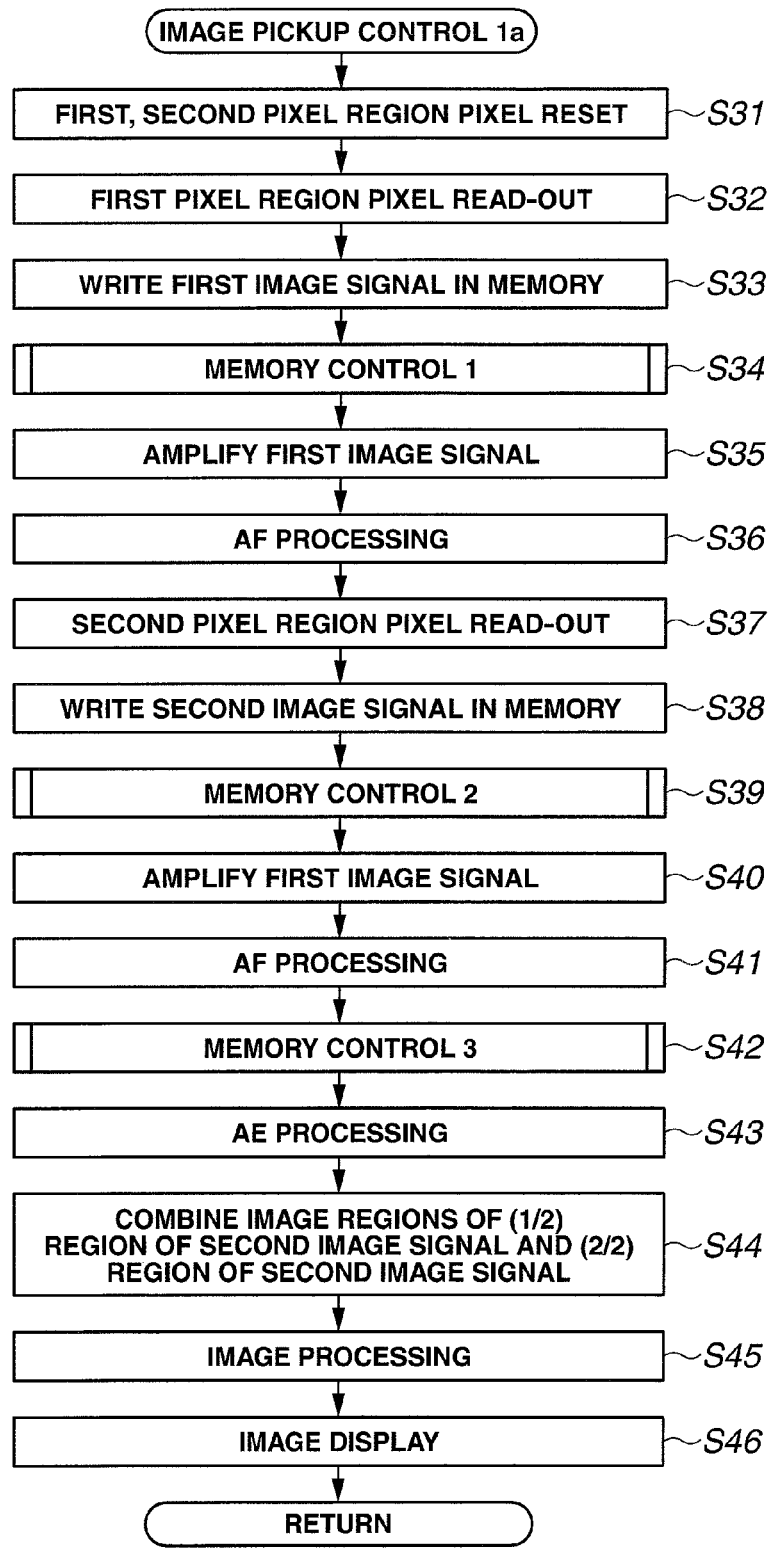
FIG. 15 is a flow chart showing processing of image pickup control 1a according to the first embodiment.

FIG. 15 is a flow chart showing the processing of the image pickup control 1*a*.

Once the processing is started, the first read-out control portion 24 sequentially resets the second pixel region including the first pixel region of the pixel portion 21 at timing shown in FIG. 10 for each line (step S31). It should be noted that here at least the second pixel region including the first pixel region is needed to be reset, but so as not to complicate the processing, all the pixels of the pixel portion 21 may also be reset.

Next, in synchronization with a vertical synchronization signal VD generated after the resetting is started, the first read-out processing portion 25 sequentially reads out at each line a first image signal from the first pixel region of the pixel portion 21 based on the control by the first read-out control portion 24 (step S32). At this time, an exposure time for AF (a charge storage time of the first pixel region) is a time of the first frame period or a time being a remainder obtained when an exposure time for display (a charge storage time of the second pixel region) is divided by the first frame period. In this manner, if a charge storage time of the second pixel region is longer than the first frame period, a total charge storage time of the first pixel region in the second frame period is equalized with the charge storage time of the second pixel region. In the specific example shown in FIG. 10, an exposure time for AF is $1/240$ second, which is equal to the first frame period, in the first image pickup control 1*a*, but in the second image pickup control 1*a*, an exposure time for AF is $1/480$ second, which is a remainder obtained by dividing $1/160$ second, being an exposure time for display (a charge storage time of the second pixel region) by $1/240$ second being the first frame period.

Then, a read-out first image signal is written in the memory portion 22 as shown in FIG. 6 based on the control by the second read-out control portion 26 (step S33).

Figure 20:
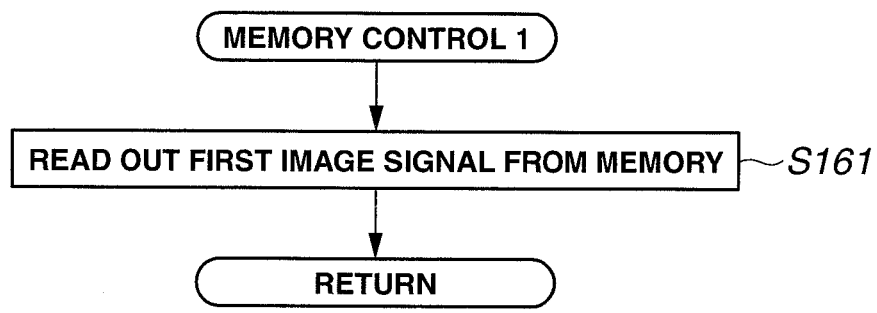
FIG. 20 is a flow chart showing processing of memory control 1 according to the first embodiment.

Next, the second read-out processing portion 27 performs the memory control 1 based on the control by the second read-out control portion 26 (step S34). FIG. 20 is a flow chart showing the processing of the memory control 1. In the memory control 1, a first image signal is read out from the memory portion 22 (step S161), and the processing returns.

The read-out first image signal is amplified by the output amplifier 23 (step S35) and outputted from the image pickup device 3. For use in the AF processing as an image signal for focal point detection, a first image signal is needed to be amplified to a best signal level for the AF processing, but because analog signal amplification is also performed by the signal processing portion 5, it is only necessary that the best signal level be attained by amplification of each amplifying portion, and it is not necessary for the output amplifier 23 to amplify the signal to the best signal level by itself.

In this manner, the AF processing portion 6 performs focal point detection processing based on the image signal for focal point detection outputted from the image pickup device 3, and based on a focal point detection result, the CPU 15 executes AF processing to drive a focus lens of the lens 1 through the lens driving portion 2 (step S36).

Next, a second image signal is sequentially read out at each line from the second pixel region of the pixel portion 21 (step S37), and the read-out second image signals are written in the memory portion 22 as shown in FIG. 6 (step S38).

Figure 21:
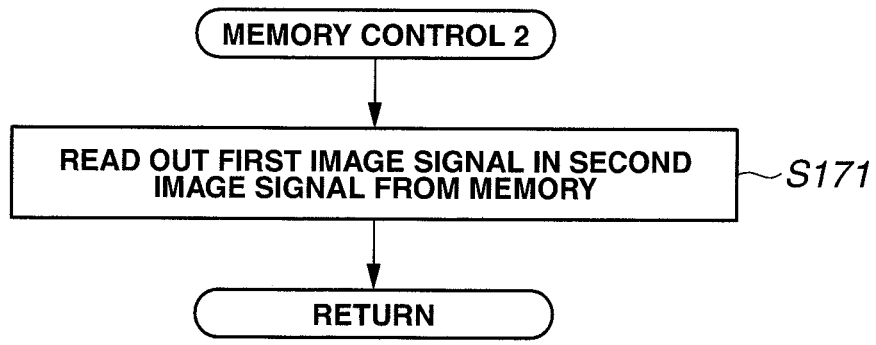
FIG. 21 is a flow chart showing processing of memory control 2 according to the first embodiment.

Then, based on the control by the second read-out control portion 26, the second read-out processing portion 27 performs memory control 2 (step S39). FIG. 21 is a flow chart showing the processing of the memory control 2. In the memory control 2, a first image signal in a second image signal stored in the memory portion 22 is read out (step S171), and the processing returns.

The read-out first image signal is amplified by the output amplifier 23 (step S40), and outputted from the image pickup device 3 as an image signal for focal point detection.

Based on the image signal for focal point detection outputted in this way, AF processing is executed as described above (step S41).

Figure 22:
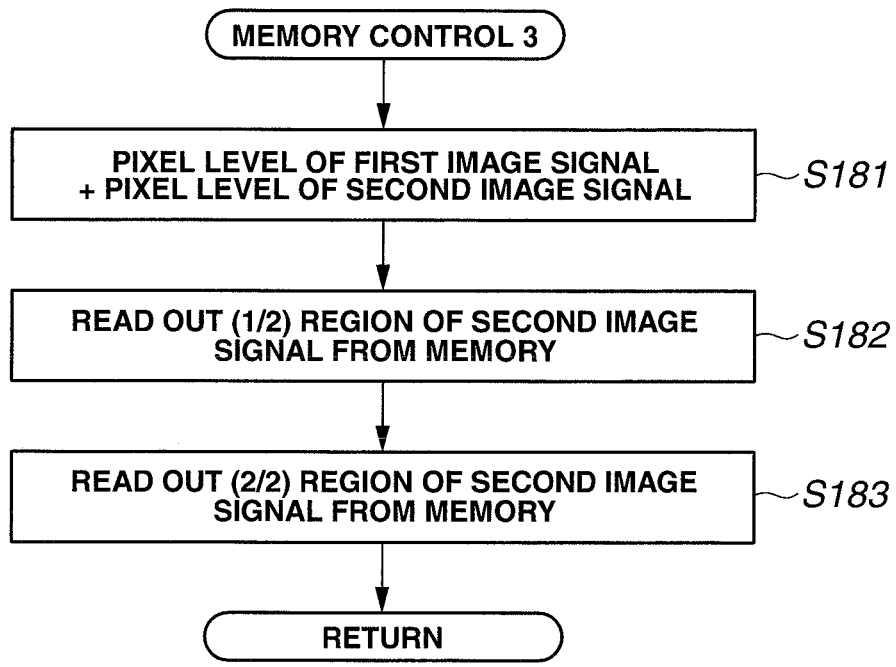
FIG. 22 is a flow chart showing processing of memory control 3 according to the first embodiment.

Next, based on the control by the second read-out control portion 26, the second read-out processing portion 27 performs memory control 3 (step S42). FIG. 22 is a flow chart showing the processing of the memory control 3. In the memory control 3, a latest second image signal stored in the memory portion 22 and a first image signal stored in the memory portion 22 and being in a first frame previous to the current frame are added for each corresponding pixel position (step S181). An image signal of one (1/2) of two divided regions of an image signal for display being a summation second image signal is read out from the memory portion 22 (step S182). Then, (within a next time period between read-out time periods for image signals for focal point detection), the other (2/2) one of the regions of the image signal is read out from the memory portion 22 (step S183), and the processing returns. In this manner, read-out of an image signal for display is carried out in a plurality of time periods between read-out time periods for an image signal for focal point detection in a divided manner.

The image signal for display read out from the image pickup device 3 is inputted to the AE processing portion 9 to calculate AE control information. Based on the calculated AE control information, a diaphragm value, an exposure time, sensitivity and the like are set by the control of the CPU 15, that is, AE processing is performed (step S43).

Also, the image signals for display divided and read out from the image pickup device 3 are processed by the signal processing portion 5 and stored in the memory portion 10.

Thereafter, the image processing portion 7 combines the processed signals into one image signal for display (step S44).

Then, the image processing portion 7 executes the above-mentioned various types of image processing on the composite image signal for display to generate an image for LV display in an LV image format (step S45).

The image for LV display is displayed on the image display portion 11 (step S46), and the processing returns to the original process.

Figure 16:
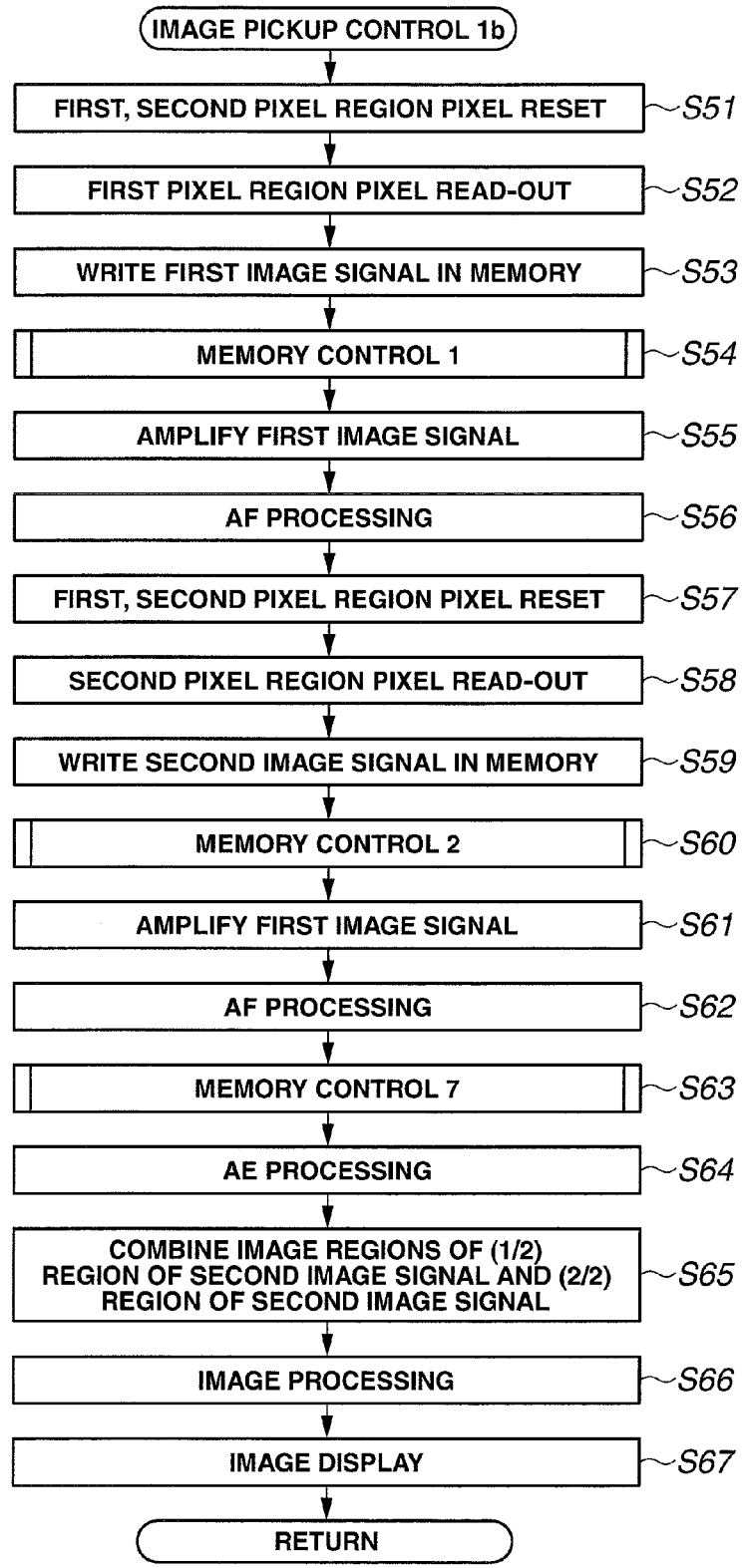
FIG. 16 is a flow chart showing processing of image pickup control 1b according to the first embodiment.

FIG. 16 is a flow chart showing the processing of the image pickup control 1b.

Once the processing is started, the first read-out control portion 24 sequentially resets the second pixel region including the first pixel region of the pixel portion 21 at timing shown in FIG. 10 for each line (step S51). It should be noted that here the second pixel region including the first pixel region is reset, but only the first pixel region may also be reset. Also, as described above, so as not to complicate the processing, all the pixels of the pixel portion 21 may also be reset.

Next, in synchronization with a vertical synchronization signal VD generated after the resetting is started, the first read-out processing portion 25 sequentially reads out at each line a first image signal from the first pixel region of the pixel portion 21 based on the control by the first read-out control portion 24 (step S52). At this time, an exposure time for AF (a charge storage time of the first pixel region) is equal to an exposure time for display (a charge storage time of the second pixel region), and in the specific example shown in FIG. 10, the exposure time for AF is $1/385$ second.

Then, a read-out first image signal is written in the memory portion 22 based on the control by the second read-out control portion 26 (step S53).

Next, the second read-out processing portion 27 performs the above-mentioned memory control 1 based on the control by the second read-out control portion 26 (step S54).

The first image signal read out in the memory control 1 is amplified by the output amplifier 23 (step S55) and outputted from the image pickup device 3. Then, the AF processing is executed as described above (step S56).

Next, the first read-out control portion 24 sequentially resets the second pixel region including the first pixel region of the pixel portion 21 for each line at timing shown in FIG. 10 (step S57). It should be noted that at least the second pixel region including the first pixel region is needed to be reset, but so as not to complicate the processing, all the pixels of the pixel portion 21 may also be reset.

Then, a second image signal is sequentially read out at each line from the second pixel region of the pixel portion 21 (step S58), and the read-out second image signals are written in the memory portion 22 as shown in FIG. 6 (step S59).

Next, based on the control by the second read-out control portion 26, the second read-out processing portion 27 performs the above-mentioned memory control 2 (step S60).

The first image signal read out in the memory control 2 is amplified by the output amplifier 23 (step S61) and outputted from the image pickup device 3. Then, the AF processing is executed as described above (step S62).

Figure 26:
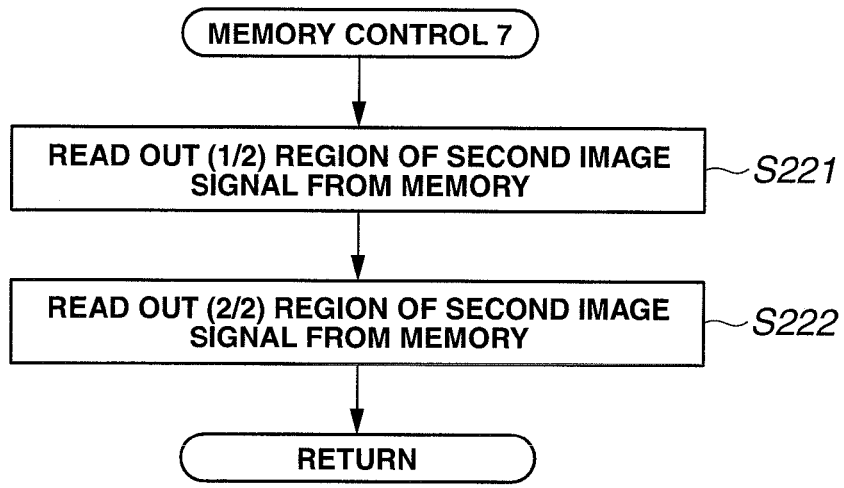
FIG. 26 is a flow chart showing processing of memory control 7 according to the first embodiment.

Next, based on the control by the second read-out control portion 26, the second read-out processing portion 27 performs memory control 7 (step S63). FIG. 26 is a flow chart showing the processing of the memory control 7 In the memory control 7, an image signal of one (1/2) of two divided regions of an image signal for display being a latest second image signal stored in the memory portion 22 is read out from the memory portion 22 (step S221). Then, (within a next time period between read-out time periods for image signals for focal point detection), the other (2/2) one of the regions of the image signal is read out from the memory portion 22 (step S222), and the processing returns. In this manner, if a charge storage time of the second pixel region is equal to or smaller than the first frame period, an image signal for display is generated and read out based only on a second image signal. Also, in the memory control 7, read-out of an image signal for display is carried out in a plurality of time periods between read-out time periods for an image signal for focal point detection in a divided manner similarly to the above-mentioned memory control 3.

Based on the image signal for display read out from the image pickup device 3 in the memory control 7, the AE processing is executed as described above (step S64).

Also, the image signals for display divided and read out from the image pickup device 3 are processed by the signal processing portion 5 and stored in the memory portion 10. Thereafter, the image processing portion 7 combines the processed signals into one image signal for display (step S65).

Then, an image for LV display is generated by the image processing portion 7 as described above based on the composite image signal for display (step S66), and displayed on the image display portion 11 (step S67). Thereafter, the processing returns to the start.

Figure 17:
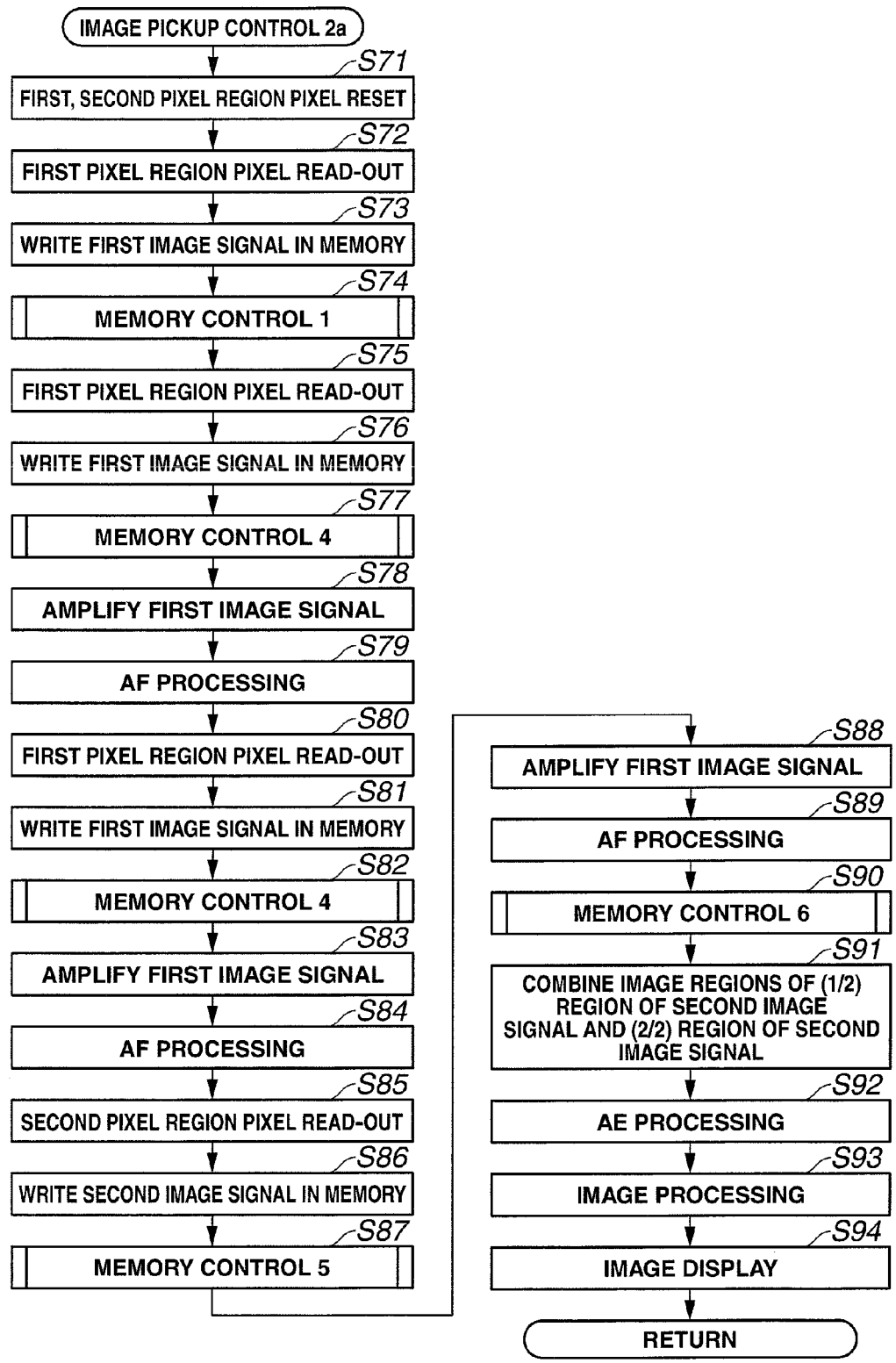
FIG. 17 is a flow chart showing processing of image pickup control 2a according to the first embodiment.

Next, FIG. 17 is a flow chart showing the processing of the image pickup control 2a.

Once the processing is started, the first read-out control portion 24 sequentially resets the second pixel region including the first pixel region of the pixel portion 21 at timing shown in FIG. 11 for each line (step S71). It should be noted that here at least the second pixel region including the first pixel region is needed to be reset, but as described above, so as not to complicate the processing, all the pixels of the pixel portion 21 may also be reset.

Next, in synchronization with a vertical synchronization signal VD generated after the resetting is started, the first read-out processing portion 25 sequentially reads out at each line a first image signal from the first pixel region of the pixel portion 21 based on the control by the first read-out control portion 24 (step S72). At this time, an exposure time for AF (a charge storage time of the first pixel region) is a time of the first frame period (in the specific example shown in FIG. 11, an exposure time for AF is $1/240$ second).

A read-out first image signal is written in the memory portion 22 based on the control by the second read-out control portion 26 (step S73).

Then, the second read-out processing portion 27 performs the above-mentioned memory control 1 based on the control by the second read-out control portion 26 (step S74).

Next, at the time when the first frame period has passed since the read-out point in step S72, the first read-out processing portion 25 sequentially reads out at each line a first image signal from the first pixel region of the pixel portion 21 based on the control by the first read-out control portion 24 (step S75).

A read-out first image signal is written in the memory portion 22 based on the control by the second read-out control portion 26 (step S76).

Figure 23:
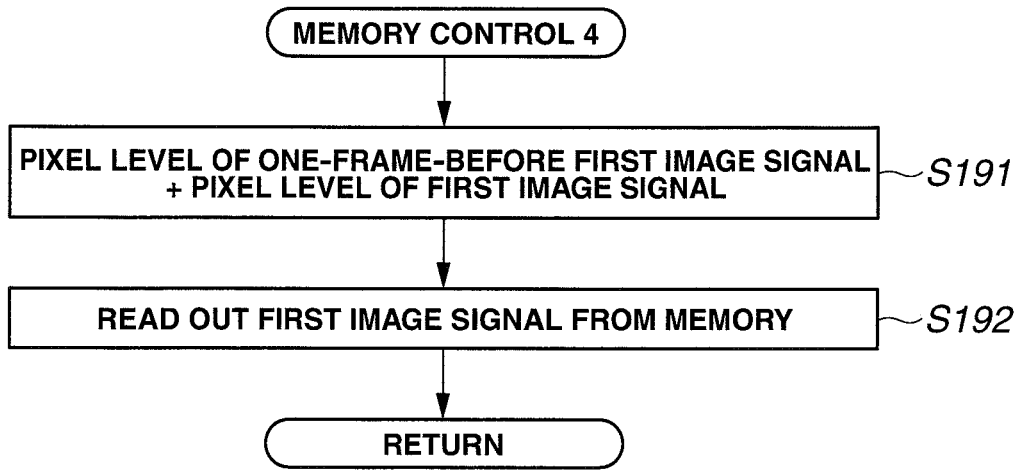
FIG. 23 is a flow chart showing processing of memory control 4 according to the first embodiment.

Then, based on the control by the second read-out control portion 26, the second read-out processing portion 27 performs memory control 4 (step S77). FIG. 23 is a flow chart showing the processing of the memory control 4. In the memory control 4, a latest first image signal stored in the memory portion 22 and a first image signal stored in the memory portion 22 and being in a first frame previous to the current frame are added for each corresponding pixel position (step S191). An image signal for focal point detection being a summation first image signal is read out from the memory portion 22 (step S192), and the processing returns. In this manner, an image signal for focal point detection is generated and read out based on signals obtained by adding first image signals related to consecutive multiple frames including a latest frame picked up by the pixel portion 21 for each pixel.

The image signal for focal point detection read out in the memory control 4 is amplified by the output amplifier 23 (step S78) and outputted from the image pickup device 3. Then, the AF processing is executed as described above (step S79).

Next, at the time when the first frame period has passed since the read-out point in step S75, the first read-out processing portion 25 sequentially reads out at each line a first image signal from the first pixel region of the pixel portion 21 based on the control by the first read-out control portion 24 (step S80).

A read-out first image signal is written in the memory portion 22 based on the control by the second read-out control portion 26 (step S81).

Then, based on the control by the second read-out control portion 26, the second read-out processing portion 27 performs the above-mentioned memory control 4 (step S82).

The image signal for focal point detection read out in the memory control 4 is amplified by the output amplifier 23 (step S83) and outputted from the image pickup device 3. Then, the AF processing is executed as described above (step S84).

Next, at the time when the first frame period has passed since the read-out point in step S80, the first read-out processing portion 25 sequentially reads out at each line a second image signal from the second pixel region of the pixel portion 21 based on the control by the first read-out control portion 24 (step S85).

A read-out second image signal is written in the memory portion 22 based on the control by the second read-out control portion 26 as shown in FIG. 7 (step S86).

Figure 24:
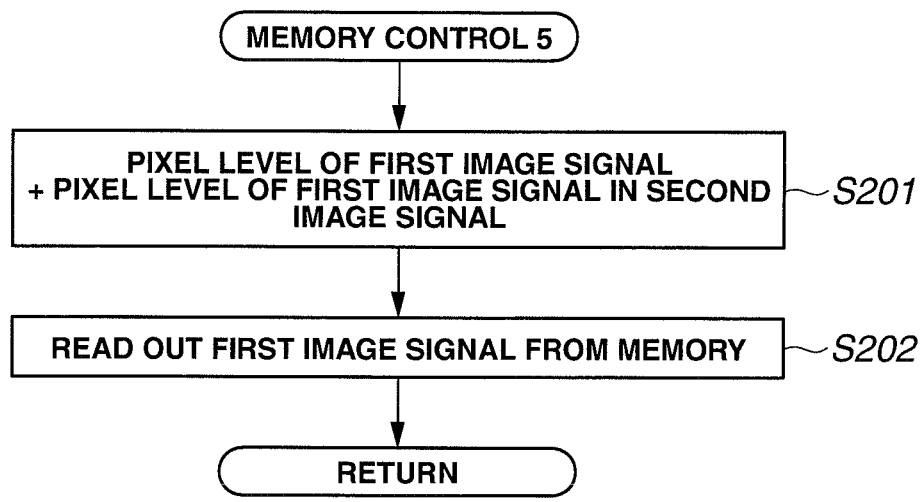
FIG. 24 is a flow chart showing processing of memory control 5 according to the first embodiment.

Then, based on the control by the second read-out control portion 26, the second read-out processing portion 27 performs memory control 5 (step S87). FIG. 24 is a flow chart showing the processing of the memory control 5. In the memory control 5, a first image signal stored in the memory portion 22 and being in a latest second image signal, and a first image signal stored in the memory portion 22 and being in a first frame previous to the current frame are added for each corresponding pixel position (step S201). An image signal for focal point detection being a summation first image signal is read out from the memory portion 22 (step S202), and the processing returns.

The image signal for focal point detection read out in the memory control 5 is amplified by the output amplifier 23 (step S88) and outputted from the image pickup device 3. Then, the AF processing is executed as described above (step S89).

Figure 25:
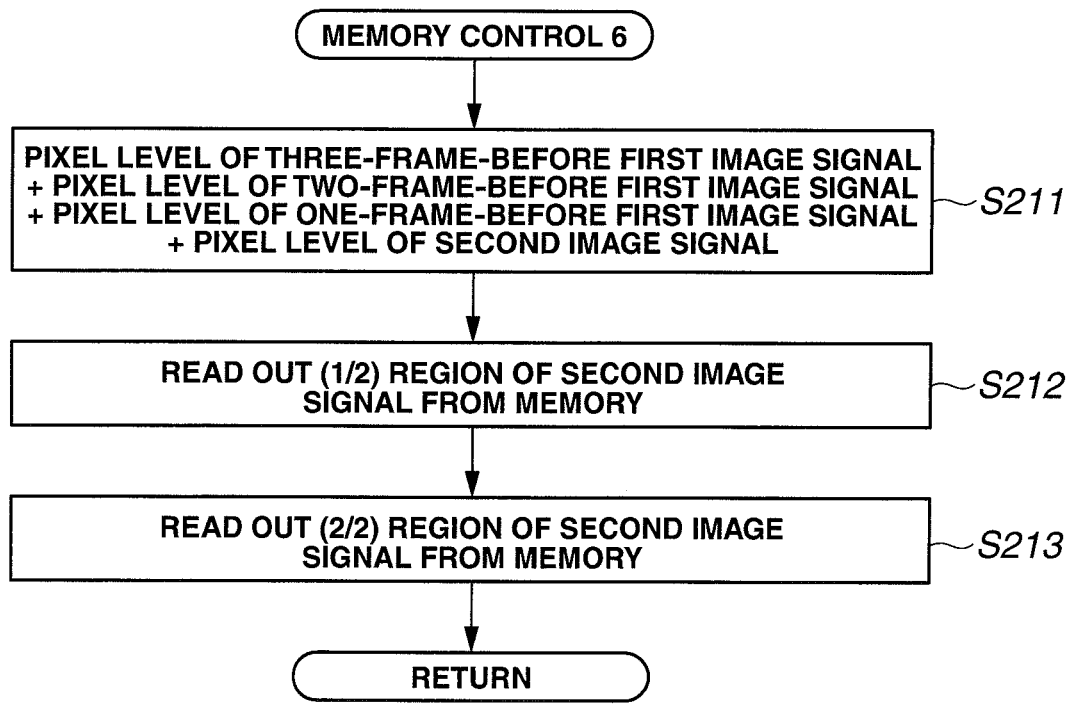
FIG. 25 is a flow chart showing processing of memory control 6 according to the first embodiment.

Furthermore, based on the control by the second read-out control portion 26, the second read-out processing portion 27 performs memory control 6 (step S90). FIG. 25 is a flow chart showing the processing of the memory control 6. In the memory control 6, a latest second image signal stored in the memory portion 22, a first image signal stored in the memory portion 22 and being in a first frame previous to the current frame, a first image signal stored in the memory portion 22 and being in a second frame previous to the current frame, and a first image signal stored in the memory portion 22 and being in a third frame previous to the current frame are added for each corresponding pixel position (step S211). An image signal of one (1/2) of two divided regions of an image signal for display being a summation second image signal is read out from the memory portion 22 (step S212). Thereafter, (within a next time period between read-out time periods for image signals for focal point detection), the other (2/2) one of the regions of the image signal is read out from the memory portion 22 (step S213), and the processing returns. In the memory control 6, read-out of an image signal for display is carried out in a plurality of time periods between read-out time periods for an image signal for focal point detection in a divided manner similarly to the above-mentioned memory control 3.

The image signals for display divided and read out from the image pickup device 3 are processed by the signal processing portion 5 and stored in the memory portion 10. Thereafter, the image processing portion 7 combines the processed signals into one image signal for display (step S91).

The AE processing is executed as described above based on the composite image signal for display (step S92), and the image processing portion 7 generates an image for LV display as described above (step S93). The generated image is displayed on the image display portion 11 (step S94).

Then, the processing returns to the start.

Figure 18:
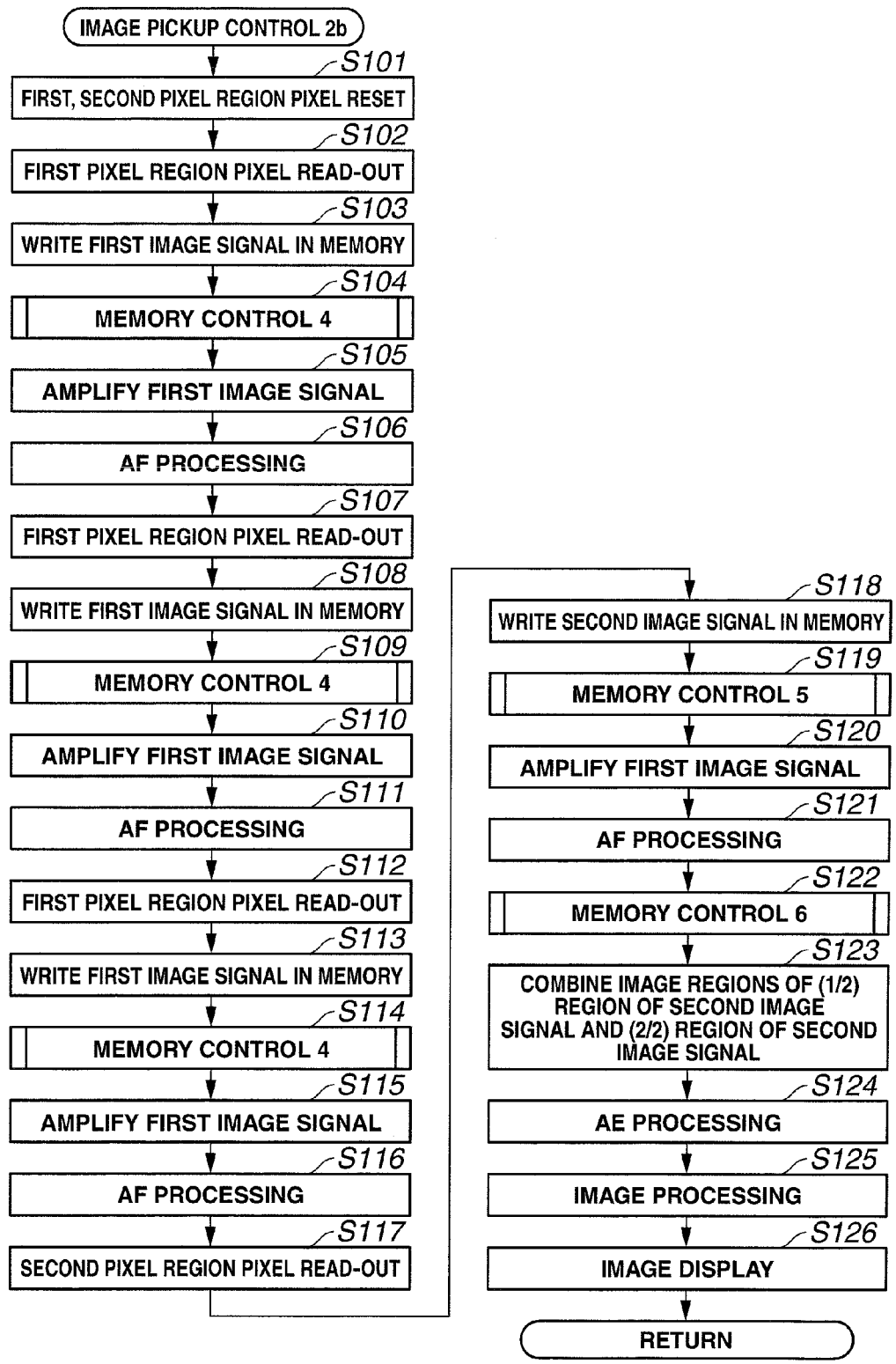
FIG. 18 is a flow chart showing processing of image pickup control 2b according to the first embodiment.

FIG. 18 is a flow chart showing the processing of the image pickup control 2b.

Once the processing is started, the first read-out control portion 24 sequentially resets the second pixel region including the first pixel region of the pixel portion 21 at timing shown in FIG. 11 for each line (step S101). It should be noted that here at least the second pixel region including the first pixel region is needed to be reset, but as described above, so as not to complicate the processing, all the pixels of the pixel portion 21 may also be reset.

Next, in synchronization with a vertical synchronization signal VD generated after the resetting is started, the first read-out processing portion 25 sequentially reads out at each line a first image signal from the first pixel region of the pixel portion 21 based on the control by the first read-out control portion 24 (step S102). At this time, an exposure time for AF (a charge storage time of the first pixel region) is a time of the first frame period, or a time being a remainder obtained by dividing an exposure time for display (a charge storage time of the second pixel region) by the first frame period. In the specific example shown in FIG. 11, an exposure time for AF is 1/480 second, which is a remainder obtained by dividing 7/480 second being an exposure time for display (a charge storage time of the second pixel region) by 1/240 second being the first frame period.

A read-out first image signal is written in the memory portion 22 based on the control by the second read-out control portion 26 (step S103).

Then, based on the control by the second read-out control portion 26, the second read-out processing portion 27 performs the above-mentioned memory control 4 (step S104).

The image signal for focal point detection read out in the memory control 4 is amplified by the output amplifier 23 (step S105) and outputted from the image pickup device 3. Then, the AF processing is executed as described above (step S106).

Next, at the time when the first frame period has passed since the read-out point in step S102, the first read-out processing portion 25 sequentially reads out at each line a first image signal from the first pixel region of the pixel portion 21 based on the control by the first read-out control portion 24 (step S107).

A read-out first image signal is written in the memory portion 22 based on the control by the second read-out control portion 26 (step S108).

Then, based on the control by the second read-out control portion 26, the second read-out processing portion 27 performs the above-mentioned memory control 4 (step S109).

The image signal for focal point detection read out in the memory control 4 is amplified by the output amplifier 23 (step S110) and outputted from the image pickup device 3. Then, the AF processing is executed as described above (step S111).

Next, at the time when the first frame period has passed since the read-out point in step S107, the first read-out processing portion 25 sequentially reads out at each line a first image signal from the first pixel region of the pixel portion 21 based on the control by the first read-out control portion 24 (step S112).

A read-out first image signal is written in the memory portion 22 based on the control by the second read-out control portion 26 (step S113).

Then, based on the control by the second read-out control portion 26, the second read-out processing portion 27 performs the above-mentioned memory control 4 (step S114).

The image signal for focal point detection read out in the memory control 4 is amplified by the output amplifier 23 (step S115) and outputted from the image pickup device 3. Then, the AF processing is executed as described above (step S116).

Next, at the time when the first frame period has passed since the read-out point in step S112, the first read-out processing portion 25 sequentially reads out at each line a second image signal from the second pixel region of the pixel portion 21 based on the control by the first read-out control portion 24 (step S117).

A read-out second image signal is written in the memory portion 22 based on the control by the second read-out control portion 26 as shown in FIG. 7 (step S118).

Then, based on the control by the second read-out control portion 26, the second read-out processing portion 27 performs the above-mentioned memory control 5 (step S119).

The image signal for focal point detection read out in the memory control 5 is amplified by the output amplifier 23 (step S120) and outputted from the image pickup device 3. Then, the AF processing is executed as described above (step S121).

Furthermore, based on the control by the second read-out control portion 26, the second read-out processing portion 27 performs the above-mentioned memory control 6 (step S122).

The image signals for display divided and read out from the image pickup device 3 in the memory control 6 are processed by the signal processing portion 5 and stored in the memory portion 10. Thereafter, the image processing portion 7 combines the processed signals into one image signal for display (step S123).

The AE processing is executed as described above based on the composite image signal for display (step S124), and the image processing portion 7 generates an image for LV display as described above (step S125). The generated image is displayed on the image display portion 11 (step S126).

Then, the processing returns to the start.

Figure 19:
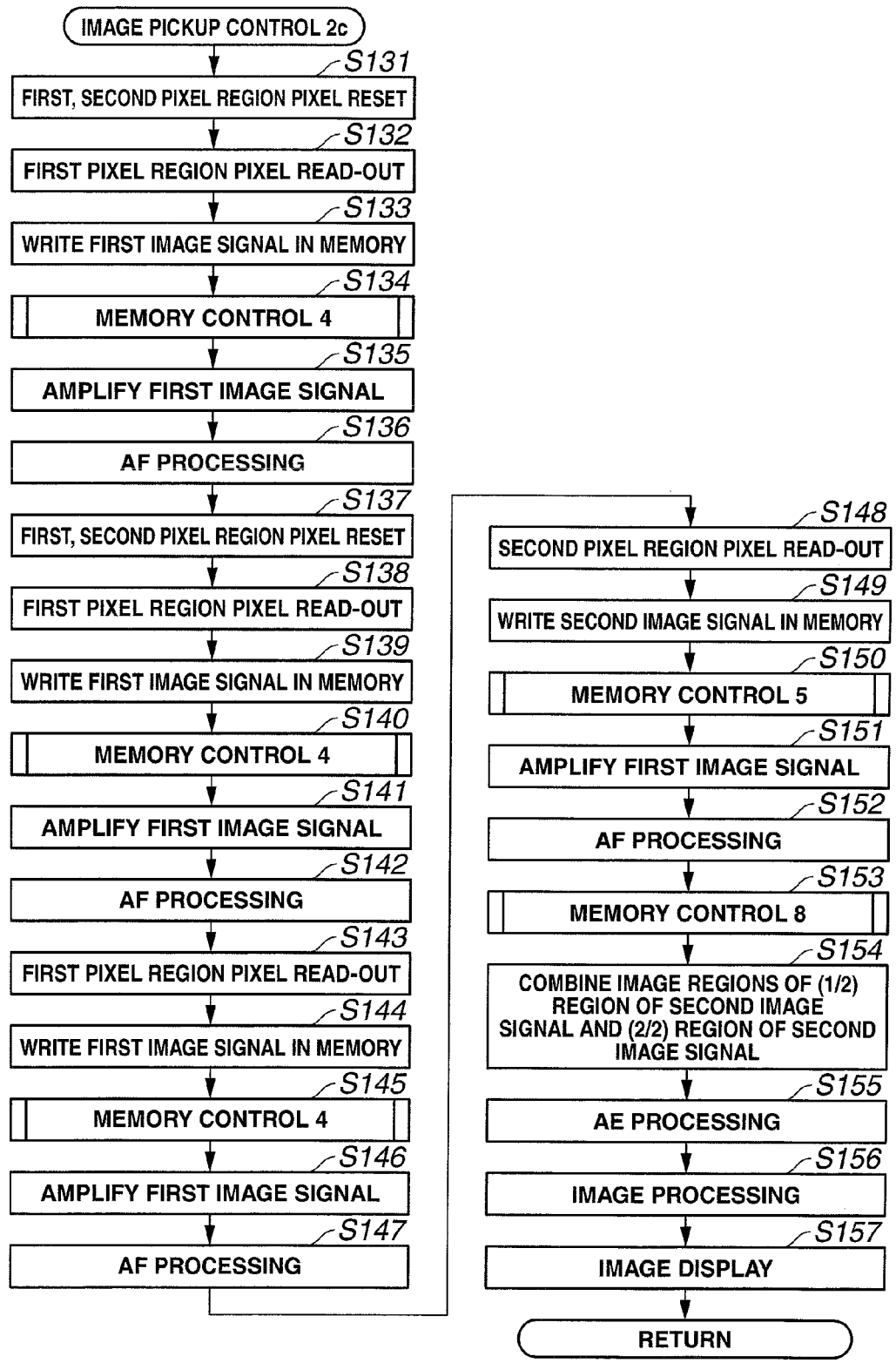
FIG. 19 is a flow chart showing processing of image pickup control 2c according to the first embodiment.

FIG. 19 is a flow chart showing the processing of the image pickup control 2c.

Once the processing is started, the first read-out control portion 24 sequentially resets the second pixel region including the first pixel region of the pixel portion 21 at timing shown in FIG. 11 for each line (step S131). It should be noted that here the second pixel region including the first pixel region is reset, but only the first pixel region may also be reset. Also, as described above, so as not to complicate the processing, all the pixels of the pixel portion 21 may also be reset.

Next, in synchronization with a vertical synchronization signal VD generated after the resetting is started, the first read-out processing portion 25 sequentially reads out at each line a first image signal from the first pixel region of the pixel portion 21 based on the control by the first read-out control portion 24 (step S132). At this time, an exposure time for AF (a charge storage time of the first pixel region) is a time of the first frame period (in the specific example shown in FIG. 11, an exposure time for AF is ¹⁄₂₄₀ second).

A read-out first image signal is written in the memory portion 22 based on the control by the second read-out control portion 26 (step S133).

Next, the second read-out processing portion 27 performs the above-mentioned memory control 4 based on the control by the second read-out control portion 26 (step S134).

The image signal for focal point detection read out in the memory control 4 is amplified by the output amplifier 23 (step S135) and outputted from the image pickup device 3. Then, the AF processing is executed as described above (step S136).

Next, the first read-out control portion 24 sequentially resets the second pixel region including the first pixel region of the pixel portion 21 for each line at timing shown in FIG. 11 (step S137). It should be noted that here at least the second pixel region including the first pixel region is needed to be reset, but so as not to complicate the processing, all the pixels of the pixel portion 21 may also be reset.

Next, in synchronization with a vertical synchronization signal VD generated after the resetting is started, the first read-out processing portion 25 sequentially reads out at each line a first image signal from the first pixel region of the pixel portion 21 based on the control by the first read-out control portion 24 (step S138). At this time, an exposure time for AF (a charge storage time of the first pixel region) is a time of the first frame period, or a time being a remainder obtained by dividing an exposure time for display (a charge storage time of the second pixel region) by the first frame period. The specific example shown in FIG. 11 indicates the latter case.

A read-out first image signal is written in the memory portion 22 based on the control by the second read-out control portion 26 (step S139).

Then, based on the control by the second read-out control portion 26, the second read-out processing portion 27 performs the above-mentioned memory control 4 (step S140).

The image signal for focal point detection read out in the memory control 4 is amplified by the output amplifier 23 (step S141) and outputted from the image pickup device 3. Then, the AF processing is executed as described above (step S142).

Next, at the time when the first frame period has passed since the read-out point in step S138, the first read-out processing portion 25 sequentially reads out at each line a first image signal from the first pixel region of the pixel portion 21 based on the control by the first read-out control portion 24 (step S143).

A read-out first image signal is written in the memory portion 22 based on the control by the second read-out control portion 26 (step S144).

Then, based on the control by the second read-out control portion 26, the second read-out processing portion 27 performs the above-mentioned memory control 4 (step S145).

The image signal for focal point detection read out in the memory control 4 is amplified by the output amplifier 23 (step S146) and outputted from the image pickup device 3. Then, the AF processing is executed as described above (step S147).

Next, at the time when the first frame period has passed since the read-out point in step S143, the first read-out processing portion 25 sequentially reads out at each line a second image signal from the second pixel region of the pixel portion 21 based on the control by the first read-out control portion 24 (step S148).

A read-out second image signal is written in the memory portion 22 based on the control by the second read-out control portion 26 as shown in FIG. 7 (step S149).

Then, based on the control by the second read-out control portion 26, the second read-out processing portion 27 performs the above-mentioned memory control 5 (step S150).

The image signal for focal point detection read out in the memory control 5 is amplified by the output amplifier 23 (step S151) and outputted from the image pickup device 3. Then, the AF processing is executed as described above (step S152).

Figure 27:
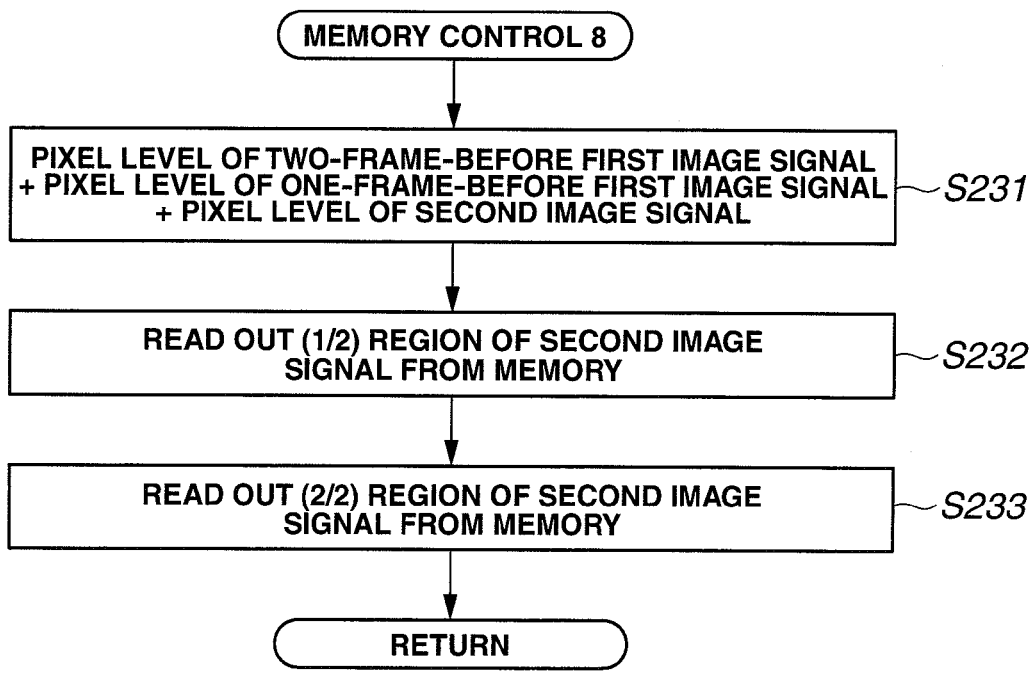
FIG. 27 is a flow chart showing processing of memory control 8 according to the first embodiment.

Furthermore, based on the control by the second read-out control portion 26, the second read-out processing portion 27 performs the memory control 8 (step S153). FIG. 27 is a flow chart showing the processing of the memory control 8. In the memory control 8, a latest second image signal stored in the memory portion 22, a first image signal stored in the memory portion 22 and being in a first frame previous to the current frame, and a first image signal stored in the memory portion 22 and being in a second frame previous to the current frame are added for each corresponding pixel position (step S231). An image signal of one (1/2) of two divided regions of an image signal for display being a summation second image signal is read out from the memory portion 22 (step S232). Thereafter, (within a next time period between read-out time periods for image signals for focal point detection), the other (2/2) one of the regions of the image signal is read out from the memory portion 22 (step S233), and the processing returns. In the memory control 8, read-out of an image signal for display is carried out in a plurality of time periods between read-out time periods for an image signal for focal point detection in a divided manner similarly to the above-mentioned memory control 3.

The image signals for display divided and read out from the image pickup device 3 in the memory control 8 are processed by the signal processing portion 5 and stored in the memory portion 10. Thereafter, the image processing portion 7 combines the processed signals into one image signal for display (step S154).

The AE processing is executed as described above based on the composite image signal for display (step S155), and the image processing portion 7 generates an image for LV display as described above (step S156). The generated image is displayed on the image display portion 11 (step S157).

Then, the processing returns to the start.

It should be noted that in the above-mentioned image pickup control 2, two frames of a latest first image signal and a first image signal in a first frame previous to the current frame, stored in memory, are sequentially added and read out as an image signal for focal point detection, but of course, more frames may be added to improve an S/N ratio, thereby providing reliable focal point detection.

According to the embodiment 1, since charge accumulation of a first image signal and charge accumulation of a second image signal are simultaneously carried out, and image pickup control is performed in which the first image signal is read out independently of read-out of the second image signal, both high-speed contrast focal point detection and high-definition live view display can be provided.

Also, since an image signal for display is generated based on a signal obtained by adding a first image signal and a second image signal for each corresponding pixel position as needed, a charge storage time of some pixels in an image signal for display can be prevented from becoming extremely short, and thereby an S/N ratio can be improved.

Furthermore, since a total charge storage time of the first pixel region in the second frame period is equalized to a charge storage time of the second pixel region, it is not necessary to carry out signal amplification and the like with different amplification factors on different pixel positions, and an exposure of a first image signal in a second image signal can be aligned with an exposure of a signal other than the first image signal in the second image signal. In this manner, an image signal for display with all the pixels having a same charge storage time can be easily obtained.

Then, because an image signal for focal point detection is generated based on a signal obtained by adding, for each pixel, first image signals related to consecutive multiple frames including a latest frame, even if a subject is under low light, accurate contrast focal point detection with few noises is allowed without reducing a frame rate of an image signal for focal point detection (namely, while high speed of contrast focal point detection is being kept).

In addition, because an image signal for display is read out in a divided manner using time periods between read-out time periods for an image signal for focal point detection, an image signal for high-definition display having a large amount of data can be read out with timing for reading out an image signal for focal point detection being kept constant.

Also, because image pickup control is performed so that timing for reading out a frame of a first image signal from the first pixel region of the pixel portion 21 is synchronized with timing for reading out a frame of a second image signal from the second pixel region, a first image signal included in a second image signal can be used as an image signal for focal point detection.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
   an image pickup device including a pixel portion having two-dimensionally arranged pixels and an analog memory in which an image signal read out from the pixel portion is stored;
   an image signal storage control portion that, in a first frame period, reads out a first image signal from a first pixel region of the pixel portion and stores the first image signal in the analog memory as well as, in a second frame period longer than the first frame period, reads out a second image signal including the first image signal from a second pixel region of the pixel portion including the first pixel region and having a larger number of pixels than the first pixel region and stores the second image signal in the analog memory;
   an image signal read-out control portion that reads out an image signal for focal point detection based on the first image signal and reads out an image signal for display based on the second image signal from the analog memory;
   a focal point detecting portion that carries out contrast focal point detection based on the image signal for focal point detection; and
   an image display portion that displays an image based on the image signal for display,
   wherein if a charge storage time of the second pixel region is longer than the first frame period, the image signal read-out control portion generates and reads out an image signal for display based on a signal obtained by adding the first image signal and the second image signal for each corresponding pixel position, and
   if the charge storage time of the second pixel region is equal to or smaller than the first frame period, the image signal read-out control portion generates and reads out an image signal for display based only on the second image signal.

2. The image pickup apparatus according to claim 1, wherein if the charge storage time of the second pixel region is longer than the first frame period, a total charge storage time of the first pixel region in the second frame period is equal to the charge storage time of the second pixel region.

3. The image pickup apparatus according to claim 1, wherein the image signal read-out control portion generates and reads out the image signal for focal point detection based on a signal obtained by adding, for each pixel, first image signals related to a plurality of consecutive frames including a latest frame picked up by the pixel portion.

4. The image pickup apparatus according to claim 1, wherein the image signal read-out control portion reads out the image signal for display in a plurality of time periods between read-out time periods for the image signal for focal point detection in a divided manner.

5. An image pickup apparatus comprising:
   an image pickup device including a pixel portion having two-dimensionally arranged pixels and an analog memory in which an image signal read out from the pixel portion is stored;
   an image signal storage control portion that, in a first frame period, reads out a first image signal from a first pixel region of the pixel portion and stores the first image signal in the analog memory as well as, in a second frame period longer than the first frame period, reads out a second image signal including the first image signal from a second pixel region of the pixel portion including the first pixel region and having a larger number of pixels than the first pixel region and stores the second image signal in the analog memory;
   an image signal read-out control portion that reads out an image signal for focal point detection based on the first image signal and reads out an image signal for display based on the second image signal from the analog memory;
   a focal point detecting portion that carries out contrast focal point detection based on the image signal for focal point detection; and
   an image display portion that displays an image based on the image signal for display,
   wherein the image signal read-out control portion reads out the image signal for display in a plurality of time periods between read-out time periods for the image signal for focal point detection in a divided manner.

* * * * *